US012764243B2

(12) United States Patent
Shimakawa

(10) Patent No.: US 12,764,243 B2
(45) Date of Patent: Oct. 13, 2026

(54) CONTROL METHOD OF INFORMATION PROCESSING APPARATUS AND INFORMATION PROCESSING SYSTEM FOR TRANSMITTING PROGRAM TO IMAGE FORMING APPARATUS BASED ON COOPERATION BETWEEN INFORMATION PROCESSING APPARATUS AND IMAGE FORMING APPARATUS

(71) Applicant: CANON KABUSHIKI KAISHA, Tokyo (JP)

(72) Inventor: Yasunori Shimakawa, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 99 days.

(21) Appl. No.: 18/491,052

(22) Filed: Oct. 20, 2023

(65) Prior Publication Data

US 2024/0146855 A1 May 2, 2024

(30) Foreign Application Priority Data

Oct. 28, 2022 (JP) ................................ 2022-172867

(51) Int. Cl.
*H04N 1/00* (2006.01)

(52) U.S. Cl.
CPC ..... *H04N 1/00973* (2013.01); *H04N 1/00938* (2013.01)

(58) Field of Classification Search
CPC ..................... H04N 1/00973; H04N 1/009384
See application file for complete search history.

(56) References Cited

U.S. PATENT DOCUMENTS

| | | | | |
|---|---|---|---|---|
| 2007/0169104 | A1* | 7/2007 | Morita | G06F 8/65 717/170 |
| 2012/0127541 | A1* | 5/2012 | Kishida | H04N 1/00973 358/474 |
| 2015/0154015 | A1* | 6/2015 | Ukai | G01C 21/3697 717/170 |
| 2019/0104230 | A1* | 4/2019 | Asai | H04N 1/00474 |
| 2019/0286811 | A1* | 9/2019 | Okumura | G06F 21/45 |
| 2020/0167111 | A1* | 5/2020 | Oshima | G06F 3/1203 |
| 2020/0310704 | A1* | 10/2020 | Hanano | H04N 1/00822 |
| 2020/0344658 | A1* | 10/2020 | Huang | H04W 36/22 |
| 2020/0387362 | A1* | 12/2020 | Tsuboi | G06F 8/71 |
| 2020/0409684 | A1* | 12/2020 | Shibukawa | H04N 1/00973 |
| 2022/0337718 | A1* | 10/2022 | Matsui | G06F 3/123 |
| 2024/0143387 | A1* | 5/2024 | Brinkhoff | G06F 11/328 |

FOREIGN PATENT DOCUMENTS

JP 2020166695 A 10/2020

* cited by examiner

*Primary Examiner* — Juan M Guillermety
(74) *Attorney, Agent, or Firm* — Canon U.S.A., Inc. IP Division

(57) ABSTRACT

An application program that is executed by an information processing apparatus configured to communicate with an image forming apparatus via a network, the application program includes executing a first program having a cooperation function of causing the image forming apparatus and the information processing apparatus to cooperate with each other, and transmitting a second program contained in the first program, wherein based on the cooperation function being enabled via the first program being executed by the executing, the transmitting transmits the second program to the image forming apparatus.

21 Claims, 32 Drawing Sheets

CONTROL METHOD OF INFORMATION PROCESSING APPARATUS AND INFORMATION PROCESSING SYSTEM FOR TRANSMITTING PROGRAM TO IMAGE FORMING APPARATUS BASED ON COOPERATION BETWEEN INFORMATION PROCESSING APPARATUS AND IMAGE FORMING APPARATUS

BACKGROUND

Field of the Disclosure

The present disclosure relates to a control method of an information processing apparatus and an information processing system.

Description of the Related Art

Downloading and installing applications has been utilized as a known technique for improving functions of information processing apparatuses, such as an image forming apparatus and an image reading device.

With a technique discussed in Japanese Patent Application Laid-Open No. 2020-166695, an application is installed onto an image forming apparatus to use the image forming apparatus.

SUMMARY

According to an aspect of the present disclosure, a control method of an information processing apparatus that is configured to communicate with an image forming apparatus via a network, the method includes executing a first program having a cooperation function of causing the image forming apparatus and the information processing apparatus to cooperate with each other, and transmitting a second program contained in the first program, and wherein, based on the cooperation function being enabled via the first program being executed by the executing, the transmitting transmits the second program to the image forming apparatus.

Further features of the present disclosure will become apparent from the following description of embodiments with reference to the attached drawings.

DESCRIPTION OF THE EMBODIMENTS

Each embodiment of the present disclosure will be described in detail with reference to the accompanying drawings. The following embodiments are not intended to limit the disclosure set forth in the appended claims. In addition, not all the combinations of features described in each embodiment are always essential to the solution of the present disclosure. In the present embodiment, the description will be given using an image forming apparatus as an example of an information processing apparatus, but the information processing apparatus is not limited to this.

A first embodiment of the present disclosure will be described.

Figure 1:
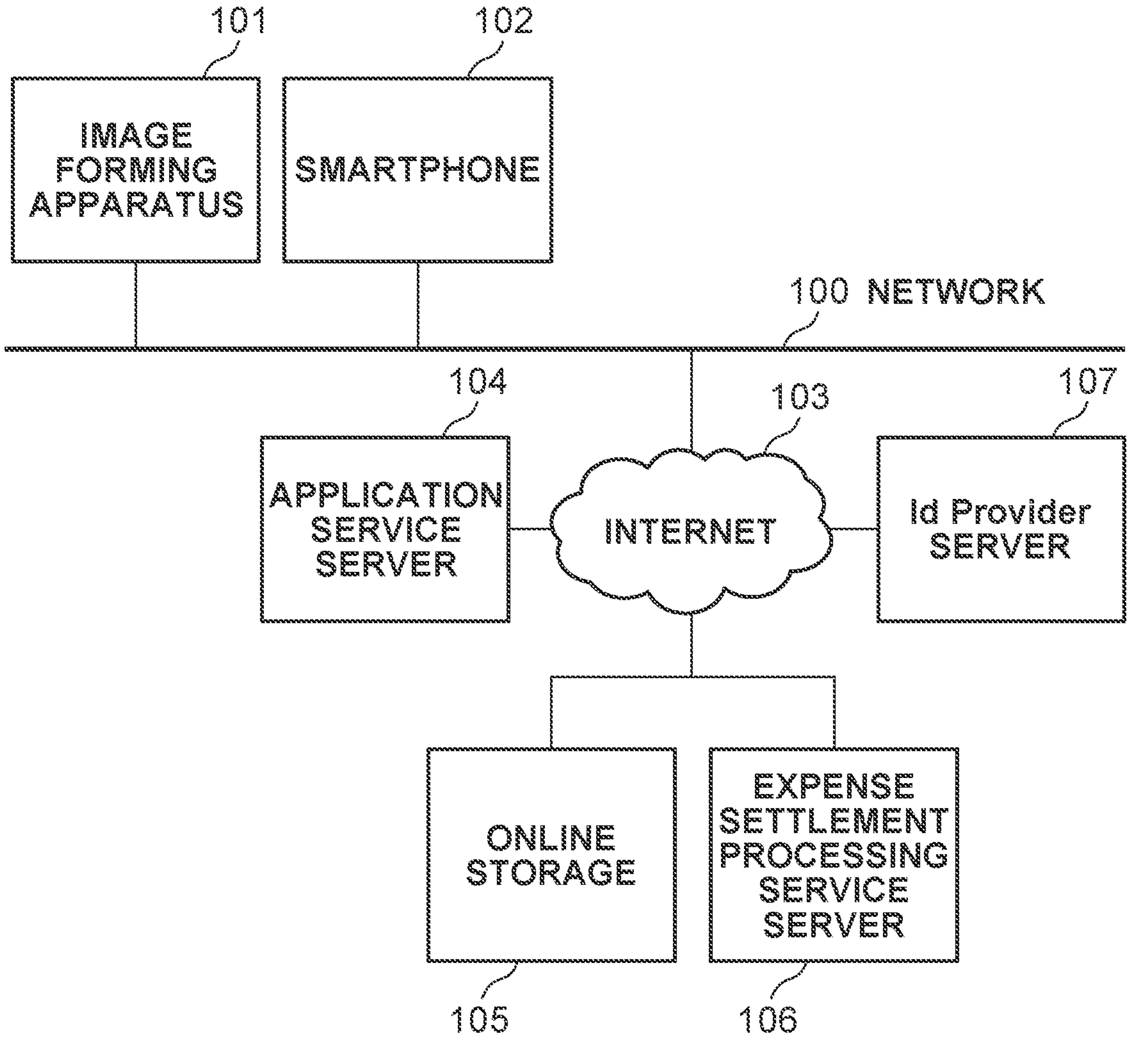
FIG. 1 is a diagram illustrating a configuration of an information processing system.

FIG. 1 is a block diagram illustrating a configuration of an information processing system according to an embodiment of the present disclosure. An image forming apparatus 101 is an example of an image processing apparatus. In the present embodiment, the image forming apparatus 101 is a multifunction peripheral (MFP).

The image forming apparatus 101 can communicate with a smartphone 102 (information processing apparatus) via a network 100. The network 100 is connected to the internet 103.

The network 100 has a network configuration in which image data is able to be transmitted. The network 100 may have a configuration of being connected with the image forming apparatus 101 via a cable, and wirelessly connected with the smartphone 102 via an access point (not illustrated). The image data in the present embodiment is electronic data. Specifically, the image data is not limited to electronic RAW data converted from an image, and may be electronic data in various image formats, such as a Tag Image File Format (TIFF) and a Joint Photographic Experts Group (JPEG) format, or electronic data in a Portable Document Format (PDF) format.

An application service server 104 that provides a web service, an online storage 105, an expense settlement processing service server 106, and an Id Provider server 107 for performing authentication are connected to the internet 103.

The application service server 104 connects with the smartphone 102 and executes authentication. Then, in a case where a user account has been registered, the application service server 104 displays a catalog of application programs (hereinafter, applications), and a necessary application is able to be downloaded and installed onto the smartphone 102.

The online storage 105 is a storage system that stores images and setting information onto a server via the internet 103.

The expense settlement processing service server 106 executes expense settlement processing by acquiring numerical data and character data from a result of optical character recognition (OCR) processing of a received image, and analyzing the acquired numerical data and character data using artificial intelligence (AI) or the like.

The Id Provider server 107 performs access for authentication to access the application service server 104, the online storage 105, and the expense settlement processing service server 106 from the image forming apparatus 101 and the smartphone 102. In a case where the Id Provider server 107 accesses each server to use a service, the Id Provider server 107 acquires authentication information by redirecting and logging into the image forming apparatus 101 and the smartphone 102. The Id Provider server 107 accesses each server using the acquired authentication information, whereby the user is able to use a service.

The image forming apparatus 101, the smartphone 102, the application service server 104, the online storage 105, the expense settlement processing service server 106, and the Id Provider server 107 are able to communicate with each other.

The image forming apparatus 101 reads a document and transmits the read image data to the smartphone 102 and the online storage 105. The image forming apparatus 101 reads a document and transmits the read image data to the expense settlement processing service server 106 in accordance with a designated format.

The smartphone 102 is able to set or update a setting value of the image forming apparatus 101 in accordance with the HyperText Transfer Protocol (HTTP).

In addition, the image forming apparatus 101 includes a character recognition unit and has a function of outputting character data by recognizing a character from image data obtained by reading a document.

The smartphone 102 has a telephone function, a wireless network connection function, a web browser, and a camera function, and is able to download and install an application from the application service server 104 to execute the application. An example of the application is an application that transmits a read image to the online storage 105, acquires an image stored in the online storage 105, transmits the acquired image to the image forming apparatus 101, and causes the image forming apparatus 101 to print the image. Further, application is used for displaying an acquired status of the image forming apparatus 101, a setting of the image forming apparatus 101, transmitting print data to the image forming apparatus 101, and acquiring an image read by the image forming apparatus 101.

Figure 2A:
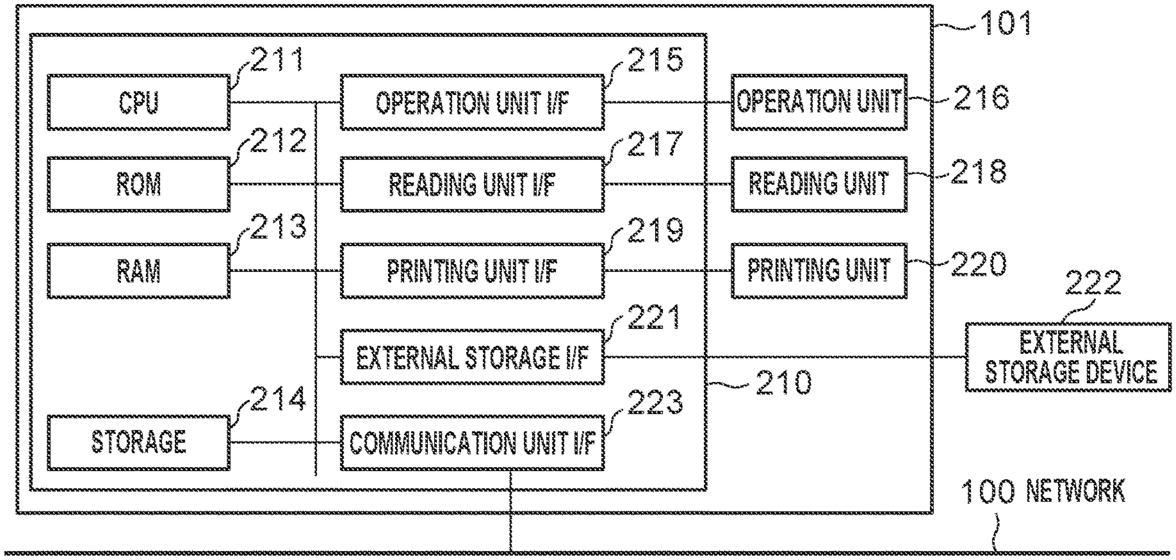
FIGS. 2A and 2B are diagrams illustrating a configuration of an image forming apparatus.
Figure 2B:
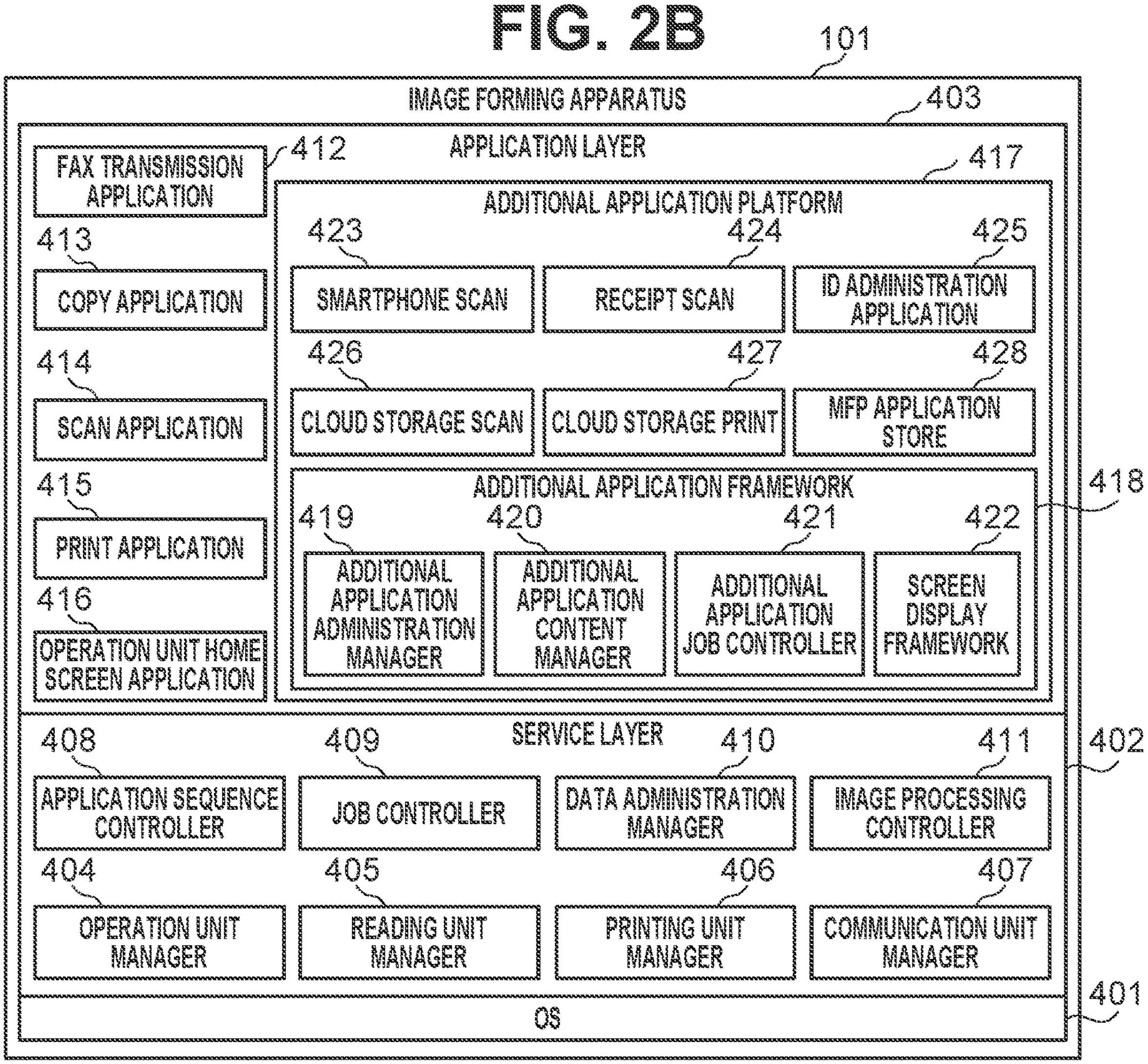

FIGS. 2A and 2B are block diagrams illustrating a configuration of the image forming apparatus 101. The block diagram illustrated in FIG. 2A is a hardware configuration of the image forming apparatus 101.

The image forming apparatus 101 includes a control unit 210, an operation unit 216, a reading unit 218, and a printing unit 220. The control unit 210 includes a central processing unit (CPU) 211, a read-only memory (ROM) 212, a random access memory (RAM) 213, a storage 214, an operation unit interface (I/F) 215, a reading unit OF 217, a printing unit OF 219, an external storage OF 221, and a communication unit OF 223.

The CPU 211 controls operations of the image forming apparatus 101. The CPU 211 loads a program stored in the ROM 212 or the storage 214 onto the RAM 213, and executes the program.

The program is a control program, for example. By executing the control program, the CPU 211 performs various types of control, such as reading control and printing control.

The ROM 212 stores programs to be executed by the CPU 211. The ROM 212 also stores boot programs and font data.

The RAM 213 is a volatile memory, and is a main memory of the CPU 211. The RAM 213 is used as a work area of the CPU 211, and as a temporary storage region where programs stored in the ROM 212 and the storage 214 are loaded. The RAM 213 is also used for temporarily storing image data.

The storage 214 stores image data, print data, an address book, a shortcut, various programs, and various types of setting information. In the present embodiment, the storage 214 is a flash memory. Alternatively, an auxiliary storage device, such as a solid state drive (SSD), a hard disk drive (HDD), or an embedded multi-media card (eMMC), may be also used.

The operation unit OF 215 connects the operation unit 216 and the control unit 210. The operation unit 216 includes hardware keys and a touch panel (display unit). The touch screen includes a touch screen sheet attached to a display. The operation unit 216 receives an operation from the user using the hardware keys and displays a screen via the touch screen.

The reading unit OF 217 connects the reading unit 218 and the control unit 210. The reading unit 218 generates image data by reading an image on a document. Image data generated by the reading unit 218 is subjected to character recognition processing, transmitted to an external apparatus, and printed onto a sheet for printing.

The printing unit OF 219 connects the printing unit 220 and the control unit 210. The CPU 211 transfers image data (print target image data) to be printed, to the printing unit 220 via the printing unit OF 219. The printing unit 220 prints an image onto a sheet fed from a sheet feeding cassette.

A method of printing an image can be any method including an electrophotographic method of printing an image using toner and an inkjet method printing an image using ink.

The external storage I/F 221 connects an external storage device 222 and the control unit 210. The CPU 211 stores image data into the external storage device 222 via the external storage OF 221. While, in the present embodiment, the external storage OF 221 is a universal serial bus (USB) interface, and the external storage device 222 is a USB memory. Alternatively, a secure digital (SD) card or the like can be used as the external storage device 222.

The control unit 210 is connected to the network 100 via the communication unit OF 223. The network 100 is a local area network (LAN), for example.

The communication unit OF 223 controls data transmission and reception via the network 100. For example, the image forming apparatus 101 transmits and receives various types of setting information in the image forming apparatus 101 to and from the smartphone 102 via the communication unit OF 223, and transmits image data to the online storage 105.

The application service server 104, the online storage 105, the expense settlement processing service server 106, and the Id Provider server 107 each include a CPU (not illustrated), a RAM (not illustrated), a ROM (not illustrated), a storage, and a communication OF (not illustrated). The application service server 104, the online storage 105, the expense settlement processing service server 106, and the Id Provider server 107 are operated via a communication I/F (not illustrated).

FIG. 2B is a block diagram illustrating an example of a software configuration of the image forming apparatus 101. For the sake of explanatory convenience, FIG. 2B mainly illustrates functions that are used in the present embodiment, but functions included in the image forming apparatus 101 are not limited to these.

The image forming apparatus 101 includes an operating system (OS) 401, a service layer 402, and an application layer 403, and functions of the image forming apparatus 101 are executed by the CPU 211.

The OS 401 is basic software of the image forming apparatus 101. Each piece of software on the image forming apparatus 101 operates on the OS 401 as a process or a thread.

The service layer 402 includes functions to control various hardware resources and is a group of software modules that provide interfaces for causing applications in the application layer 403 at a higher level to use the functions.

For example, the software modules include an operation unit manager 404 that provides functions related to the operation unit 216, and a reading unit manager 405 that provides a control function of the reading unit 218. The software modules also include a printing unit manager 406 that provides a control function of the printing unit 220, and a communication unit manager 407 that provides functions related to a wired LAN, a wireless LAN, and near field communication. The software modules also include a data administration manager 410 that performs data administration of the ROM 212, the RAM 213, the storage 214, and the external storage device 222, and an image processing controller 411 that performs image processing and format conversion, for example.

An application sequence controller 408 performs sequence administration of a job started by an application in the application layer 403. A job controller 409 performs, for example, the administration of a competing operation of jobs started by an application.

The application layer 403 is a group of applications each of which operates at a level higher than the service layer 402. The applications include basic applications, such as a facsimile (FAX) transmission application 412, a copy application 413, a scan application 414, a print application 415, and an operation unit home screen application 416, for example.

The application layer 403 also includes an additional application platform 417 including applications that can be added from an MFP application store 428 or the like. For example, the additional application platform 417 includes smartphone scan 423, receipt scan 424, ID administration application 425, cloud storage scan 426, cloud storage print 427, the MFP application store 428, and additional application framework 418.

The basic applications implement functions directly using interfaces provided by the applications included in the service layer 402. For example, in a case where the copy application 413 is started from the operation unit home screen application 416, the copy application 413 displays a copy setting screen using the operation unit manager 404. In a case where the operation unit manager 404 receives a job start instruction after a setting is performed on the copy setting screen, the operation unit manager 404 transmits setting information to the copy application 413. In accordance with the setting information, the copy application 413 performs allocation of the RAM 213 via the data administration manager 410. Then, the copy application 413 notifies the reading unit manager 405 of setting information, such as a resolution, size, color information, and the allocated region in the RAM 213, and notifies the printing unit manager 406 of setting information, such as the number of copies, a resolution, color information, and the allocated region in the RAM 213. The copy application 413 also notifies the application sequence controller 408 and the job controller 409 of operation sequences of the reading unit manager 405 and the printing unit manager 406, and determines an operation timing.

In accordance with the setting information, the reading unit manager 405 stores image data acquired from the reading unit 218 into the allocated region in the RAM 213.

Then, the printing unit manager 406 acquires image data stored in the RAM 213, transmits the acquired image data to the printing unit 220, and causes the printing unit 220 to perform printing. After completion of the printing, the printing unit manager 406 notifies the job controller 409 of the completion, and in a case where the printing unit manager 406 the job completion, the printing unit manager 406 starts the operation unit home screen application 416 and returns the image forming apparatus 101 to an idle state.

The additional application platform 417 includes the additional application framework 418 that executes additional applications. The additional application framework 418 includes an additional application administration manager 419, an additional application content manager 420, an additional application job controller 421, and a screen display framework 422.

The additional application administration manager 419 performs administration of applications added to the additional application platform 417. The additional application administration manager 419 checks additional applications held at the time of startup, notifies the operation unit home screen application 416 of the additional applications, and instructs the operation unit home screen application 416 to display icons of the additional applications. In a case where the additional application administration manager 419 receives an additional application addition request from the communication unit manager 407, the additional application administration manager 419 checks the capacity of an application addition region of the data administration manager 410. Then, in a case where the additional application administration manager 419 determines that an enough storage space is left, the additional application administration manager 419 downloads and installs an application, and displays an icon of the added application by notifying the operation unit manager 404 of the icon of the added application.

The additional application content manager 420, the additional application job controller 421, and the screen display framework 422 are used to implement the functions of additional applications. As an example, the execution of the cloud storage scan 426 will be described. In a case where an icon of the cloud storage scan 426 is pressed on the operation unit home screen application 416, the additional application administration manager 419 instructs the additional application content manager 420 to check application information of the cloud storage scan 426.

Based on the application information, the additional application content manager 420 checks whether an application is able to be loaded and whether a space of the RAM 213 to be used for scanning is able to be allocated. In a case where a space in the RAM 213 is able to be allocated, the additional application administration manager 419 loads an application of the cloud storage scan 426 that is stored in the storage 214, onto the RAM 213.

The cloud storage scan 426 loaded onto the RAM 213 uses the screen display framework 422 to cause the operation unit manager 404 to display a setting screen of the cloud storage scan 426. In a case where the operation unit manager 404 receives a job start instruction after completion of a setting on the setting screen, the operation unit manager 404 notifies the cloud storage scan 426 of the setting information via the screen display framework 422.

In accordance with the setting information, the cloud storage scan 426 notifies the reading unit manager 405 of setting information, such as a resolution, a size, color information, and the allocated region in the RAM 213.

In addition, the communication unit manager 407 notifies the additional application job controller 421 of setting information, such as an address of a transmission destination, a path, login information, and the allocated region in the RAM 213. The additional application job controller 421 notifies the application sequence controller 408 and the job controller 409 of operation sequences of the reading unit manager 405 and the communication unit manager 407, and determines an operation timing.

In accordance with the setting information, the reading unit manager 405 stores image data acquired from the reading unit 218 into the ensured region in the RAM 213. Then, the communication unit manager 407 acquires the image data stored in the RAM 213, transmits the acquired image data to the communication unit OF 223, and stores the image data into the online storage 105. After the communication unit OF 223 connects to the online storage 105 having an address set as the transmission destination and logs into the online storage 105 using login information, the communication unit OF 223 stores the image data into the designated path. After completion of the storing of image data, the online storage 105 notifies the communication unit OF 223 of the completion. Then, in a case where the communication unit OF 223 notifies of the job controller 409 the storing completion, the communication unit OF 223 starts processing of ending a job, notifies the additional application job controller 421 of a job end, starts the operation unit home screen application 416, and returns the image forming apparatus 101 to the idle state.

Figure 3:
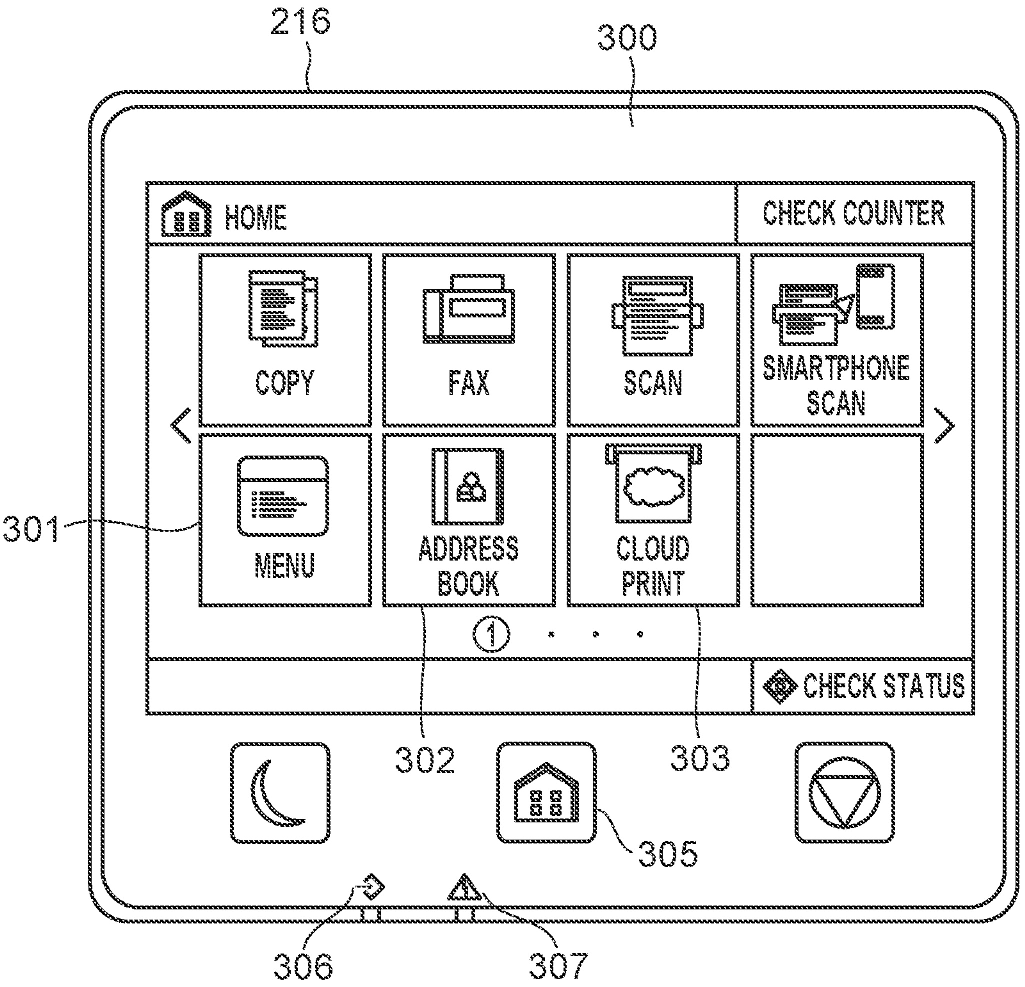
FIG. 3 is a diagram illustrating an operation unit of the image forming apparatus.

FIG. 3 is a diagram illustrating an operation unit 216. The operation unit 216 includes a touch screen 300, a data light-emitting diode (LED) 306, and an error LED 307.

On the touch screen 300 illustrated in FIG. 3, a home screen that is displayed immediately after the image forming apparatus 101 is started is displayed. The home screen is a screen on which an execution instruction of each function of the image forming apparatus 101 is issued. For example, a copy button is displayed on the home screen to receive an operation for a copy function of the printing unit 220 that prints an image based on image data generated by the reading unit 218 reading a document. A fax button is displayed on the home screen to receive an operation for a fax function with which image data generated by the reading unit 218 reading a document is transmitted with a modem (not illustrated). A scan button is also displayed on the home screen to receive an operation for a transmission function with which image data generated by the reading unit 218 reading a document is transmitted via the communication unit OF 223. The transmission function includes an electronic mail function of transmitting image data with being attached to an electronic mail, and a folder transmission function of transmitting image data to store the image data into a designated folder. Moreover, a menu button 301, an address book button 302 for calling up and displaying an address book, and a button 303 for transmitting an image to the online storage 105 are displayed on the home screen.

A home key 305 is a capacitive touch key, and is a button for changing a screen being displayed to the home screen.

The data LED 306 notifies a user that the image forming apparatus 101 currently transmits data, by lighting up during data transmission. The error LED 307 lights up in a case where an error of some sort has occurred in the image forming apparatus 101.

Figure 4A:
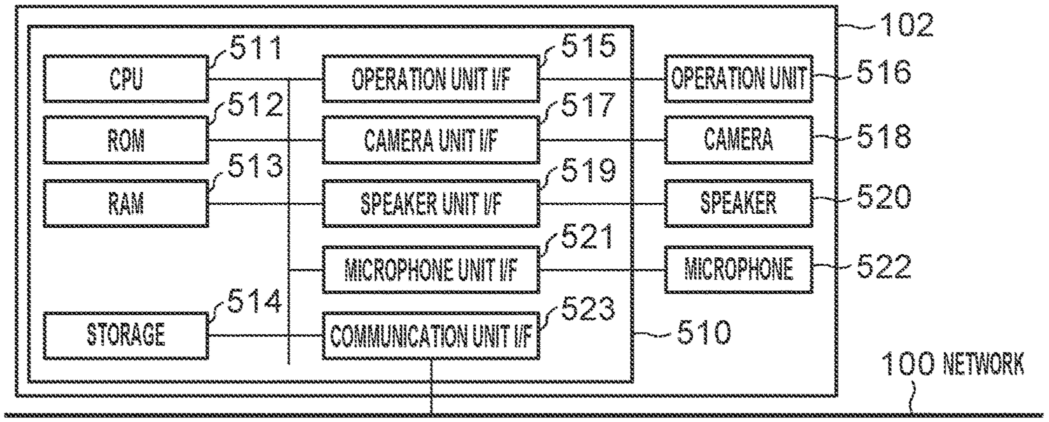
FIG. 4A is a block diagram illustrating a hardware configuration of a smartphone.
Figure 4B:
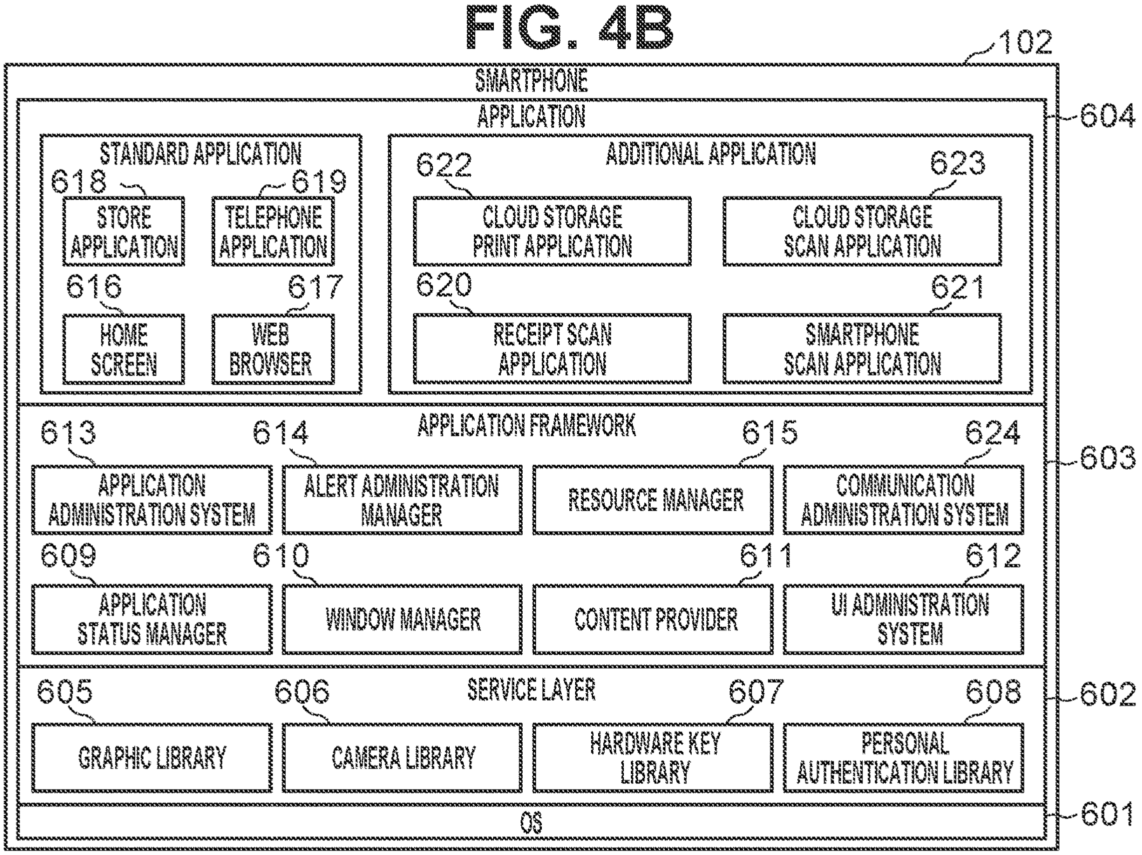
FIG. 4B is a configuration diagram illustrating an example of software of the smartphone.
Figure 4C:
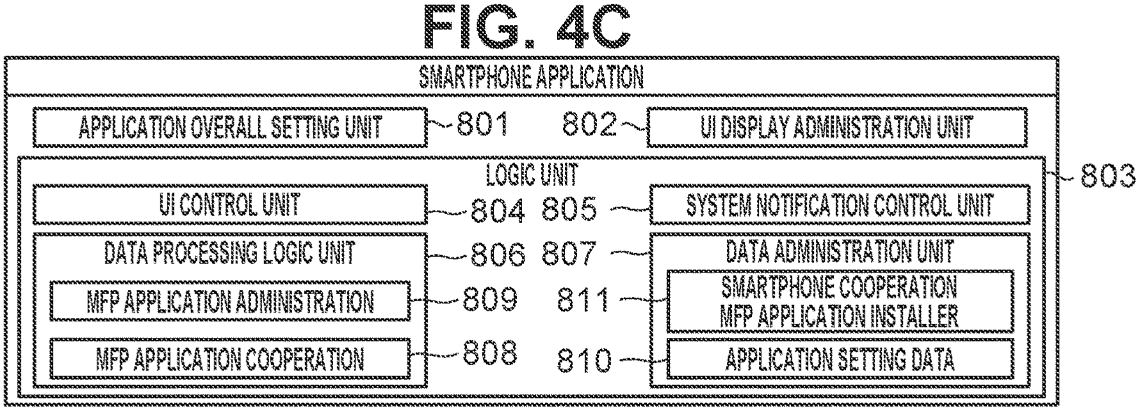
FIG. 4C illustrates an example of a configuration of an MFP cooperation smartphone application.

FIGS. 4A to 4C are block diagrams illustrating a configuration of the smartphone 102 and a configuration of an application. Among FIGS. 4A to 4C, FIG. 4A is a block diagram illustrating a hardware configuration of the smartphone 102.

The smartphone 102 includes a control unit 510 and an operation unit 516. The control unit 510 includes a CPU 511, a ROM 512, a RAM 513, a storage 514, an operation unit OF 515, a camera unit OF 517, a speaker unit OF 519, a microphone unit OF 521, and a communication unit OF 523.

The CPU 511 controls operations of the smartphone 102. The CPU 511 reads out a program stored in the ROM 512 or the storage 514, and executes the program. The program is a control program, for example. By executing the control program, the CPU 511 performs various types of control, such as communication control and camera control.

The ROM 512 stores programs that is executed by the CPU 511. The ROM 512 also stores boot programs, font data, an application, photo data, music data, and an address book.

The RAM 513 is a main storage memory of the CPU 511. The RAM 513 is used as a work area of the CPU 511, and as a temporary storage region where programs stored in the ROM 512 are loaded.

The storage 514 stores applications, image data, an address book, and music data. In the present embodiment, the storage 514 is a flash ROM storage device, such as an SD card.

The operation unit OF 515 connects the operation unit 516 and the control unit 510. The operation unit 516 includes hardware keys and a touch screen. In the touch screen, a transparent electrode of the touch screen is integrally formed with a display by deposition onto the display. The operation unit 516 receives an operation from the user using the hardware keys, and displays a screen via the touch screen.

The camera unit OF 517 connects a camera 518 and the control unit 510. The speaker unit OF 519 connects a speaker 520 and the control unit 510. The microphone unit OF 521 connects a microphone 522 and the control unit 510. When executing applications stored in the ROM 512, the control unit 510 operates the camera 518, the speaker 520, and the microphone 522 in accordance with programs.

The control unit 510 is connected to the network 100 via the communication unit OF 523. The network 100 is Wi-Fi, for example. The communication unit I/F 523 controls data transmission and reception via the network 100. For example, the smartphone 102 connects to the image forming apparatus 101, the application service server 104, the online storage 105, the expense settlement processing service server 106, and the Id Provider server 107 via the communication unit OF 523. Consequently, the smartphone 102 is able to implement functions that uses the above described units.

FIG. 4B is a configuration diagram illustrating an example of software of the smartphone 102. While FIG. 4B mainly illustrates functions that are used in the present embodiment, functions included in the smartphone 102 are not limited to these.

The smartphone 102 includes an OS 601, a service layer 602, an application framework 603, and an application layer 604, and functions of the smartphone 102 are executed by the CPU 511.

The OS 601 is basic software of the smartphone 102. Each piece of software on the smartphone 102 operates on the OS 601 as a process or a thread. In addition, the OS 601 provides libraries to be used for execution of communication, operation, and display applications.

The service layer 602 includes a graphic library 605 for two-dimensional/three-dimensional (2D/3D) display using a graphics processing unit (GPU) (not illustrated), and a camera library 606 for control of the camera 518. The service layer 602 also includes a hardware key library 607 for control of a hardware key of volume or the like, and a personal authentication library 608 for control of hardware for fingerprint authentication or face authentication. Libraries belonging to the service layer 602 are libraries corresponding to hardware/software components unsupported by the OS 601.

The application framework 603 provides functions for operations of applications. An application status manager 609 administers a life cycle of an application. A window manager 610 controls a screen state of each application. A content provider 611 administers data to be shared among applications. A user interface (UI) administration system 612 provides components, such as buttons and text boxes, that are to be used by applications for UI construction. An application administration system 613 performs administration (installation, uninstallation, etc.) of applications held on the smartphone 102. An alert administration manager 614 provides an alert function of announcing occurrence of an event. A resource manager 615 administers resources, such as character strings, graphics, and layout. A communication administration system 624 performs access to a communication function and a telephone function.

The application layer 604 is a group of applications operating on the smartphone 102. For example, the application layer 604 includes standard applications, such as a web browser 617 and a telephone application 619, and additional applications, such as a receipt scan application 620 and a cloud storage print application 622. The standard applications are applications installed on the smartphone 102 by default, and includes a home screen 616, the web browser 617, a store application 618, and the telephone application 619. The additional applications are applications downloaded from the application service server 104, and stored in the ROM 512 or the storage 514. In the present embodiment, the additional applications include the receipt scan application 620, a smartphone scan application 621, the cloud storage print application 622, and a cloud storage scan application 623.

FIG. 4C illustrates an example of a configuration of an MFP cooperation smartphone application, which is a smartphone application (having a cooperation function) on which the smartphone 102 and the image forming apparatus 101 operate in cooperation. While FIG. 4C mainly illustrates functions that are used in the present embodiment, functions included in the smartphone application are not limited to these. In the present embodiment, a state in which cooperation is able to be executed is regarded as a cooperation function available state, and a state in which cooperation is not able to be executed is regarded as a cooperation function unavailable state.

The smartphone application includes an application overall setting unit 801, a UI display administration unit 802, and a logic unit 803. The application overall setting unit 801 has a function of a system setting for operations of the smartphone application on the smartphone 102. For example, the application overall setting unit 801 sets an application name, component information of an application, permission information to be used in access to a protected region of the smartphone 102, and terminal compatibility information to be used by an application.

The UI display administration unit 802 administers data related to a UI, such as a UI image, layout, and a display setting of an application. The logic unit 803 performs cooperation with another application and data processing, and includes a UI control unit 804, a system notification control unit 805, a data processing logic unit 806, and a data administration unit 807. Using the display setting of an UI image and a layout administered by the UI display administration unit 802, the UI control unit 804 switches operation unit display in accordance with a user operation or information received from the data processing logic unit 806 or the system notification control unit 805.

The system notification control unit 805 performs processing upon receipt of a notification by the application framework 603 of the smartphone 102 from the OS 601, the service layer 602, or another application in the application layer 604. In accordance with information received from the system notification control unit 805 and the UI control unit 804, the data processing logic unit 806 performs processing in cooperation with the data administration unit 807. The data administration unit 807 administers data to be used in an application. As an example, in the case of the smartphone scan application 621, the data processing logic unit 806 includes MFP application cooperation 808 and MFP application administration 809. The data administration unit 807 includes application setting data 810 and a smartphone cooperation MFP application installer 811.

The MFP application cooperation 808 is a program for operating in cooperation with the MFP cooperation smartphone application. The MFP application administration 809 is a program that checks the existence or non-existence of the smartphone scan 423 of the image forming apparatus 101, and determines to perform installation processing in a case where the smartphone scan 423 does not exist, or determines to perform updating after checking the version of the application in a case where the smartphone scan 423 exists. The application setting data 810 is application setting data of a scan setting to be performed on the smartphone scan application 621. The smartphone cooperation MFP application installer 811 has a function of installing an application in a case where the smartphone scan 423 does not exist on an MFP that operates in cooperation with the smartphone scan application 621 on the image forming apparatus 101, or in a case where version update is required.

Figure 5A:
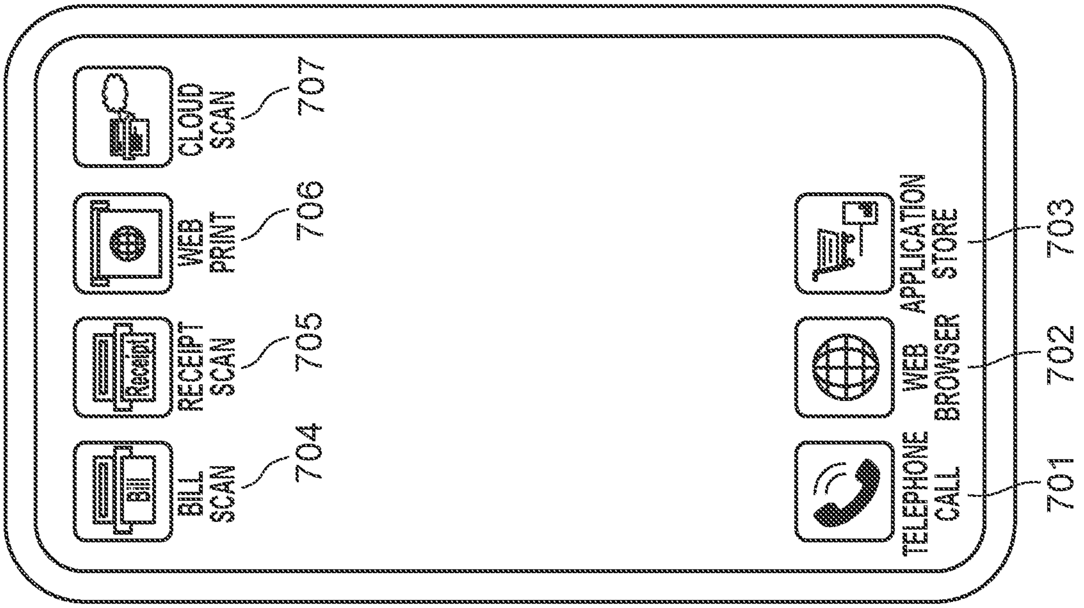
FIGS. 5A and 5B are diagrams each illustrating a home screen of the smartphone.
Figure 5B:
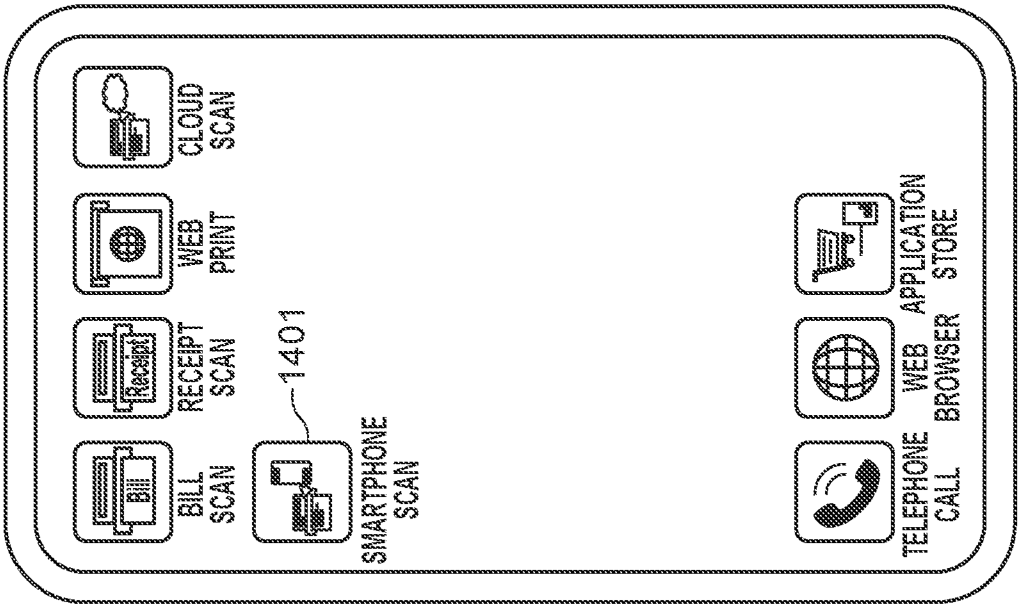

FIGS. 5A and 5B are diagrams each illustrating a home screen of the smartphone 102. FIG. 5A is a diagram illustrating a home screen of the smartphone 102. The operation unit 516 includes the touch screen, thus in a case where a displayed icon is pressed, the operation unit manager 404 determines a selected icon based on a touch position, and starts a corresponding application.

Icons of standard applications that are displayed on the operation unit 516 illustrated in FIG. 5A include a telephone call application icon 701, a web browser icon 702, and an application store icon 703. In addition, icons of additional applications include a bill scan application icon 704, a receipt scan application icon 705, a web print icon 706, and a cloud scan icon 707.

Figure 6:
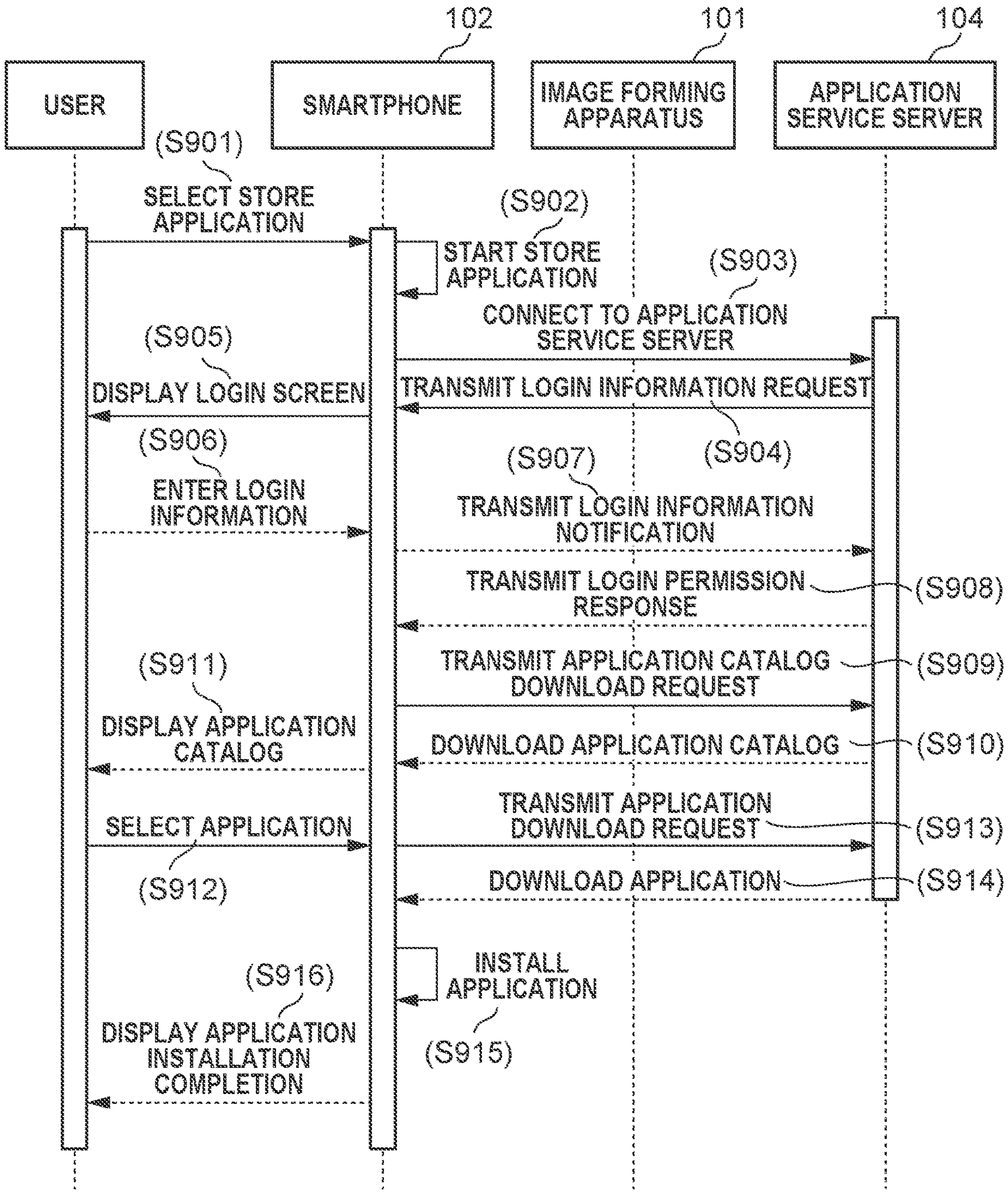
FIG. 6 is a diagram illustrating an installation processing sequence of an application onto the smartphone.

FIG. 6 illustrates a sequence of processing of accessing the application service server 104 and installing an application onto the smartphone 102.

In a case where the user touches the application store icon 703 displayed on the home screen of the smartphone 102 that illustrated in FIG. 5A, in step S901, the smartphone 102 receives a notification about a coordinate of a pressed position from a touch screen controller (not illustrated).

Figure 7A:
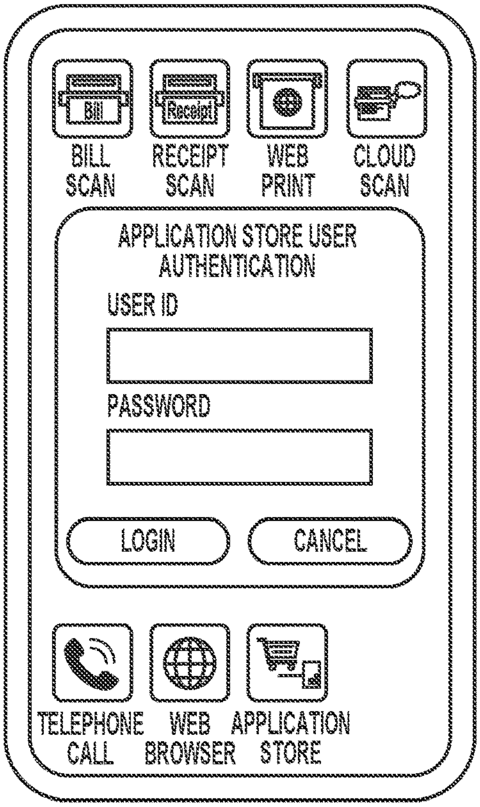
FIGS. 7A to 7D are diagrams each illustrating an operation screen related to an application store on the smartphone.

In a case where the CPU 511 of the smartphone 102 detects that the store application 618 has been selected, based on the coordinate included in the received notification, in step S902, the CPU 511 starts the store application 618. In a case where the store application 618 is started, in step S903, the store application 618 connects the smartphone 102 to the application service server 104 via the communication unit OF 523. In step S904, the store application 618 receives a login information request from the application service server 104. In step S905, to acquire login information, the smartphone 102 displays a login screen illustrated in FIG. 7A, on the operation unit 516.

In step S906, the smartphone 102 receives an input of login information about the application service server 104 from the user via the operation unit 516. In step S907, the smartphone 102 notifies the application service server 104 of the entered login information. In step S908, the application service server 104 notifies the smartphone 102 of a login permission response conforming to the login information.

Figure 7B:
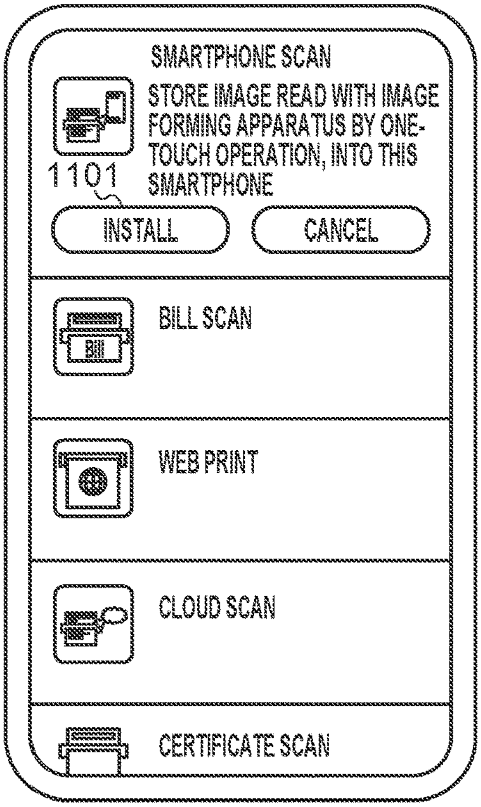
Figure 7C:
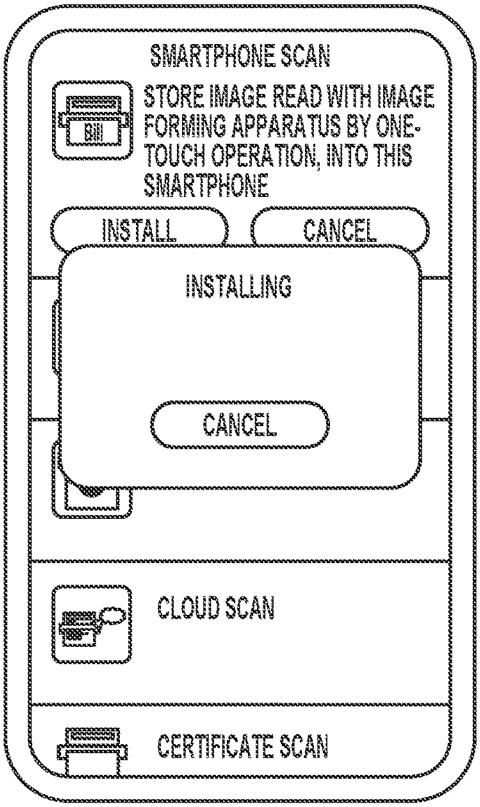

In a case where the login information is correct, in step S909, the smartphone 102 issues an application catalog download request. In a case where the login information is incorrect, the smartphone 102 returns the display to the login screen in step S905. In step S910, the application service server 104 downloads an application catalog onto the smartphone 102. The smartphone 102 displays an application catalog illustrated in FIG. 7B, on the operation unit 516. In step S912, the smartphone 102 receives a selection of an application (for example, smartphone scan application) to be installed, from the user, and an install button 1101 is pressed. In response to the pressing, the smartphone 102 displays an installation in progress screen illustrated in FIG. 7C on the operation unit 516.

In step S913, the smartphone 102 issues a download request for the smartphone scan application to the application service server 104. In step S914, the application service server 104 downloads the smartphone scan application requested by the smartphone 102. The smartphone 102 stores an installer of the downloaded application into the storage 514 or the RAM 513. In a case where the smartphone 102 starts the installer of the smartphone scan application stored in the storage 514 or the RAM 513, in step S915, the smartphone 102 notifies the application administration system 613 of the installer startup, and installs the smartphone scan application.

Figure 7D:
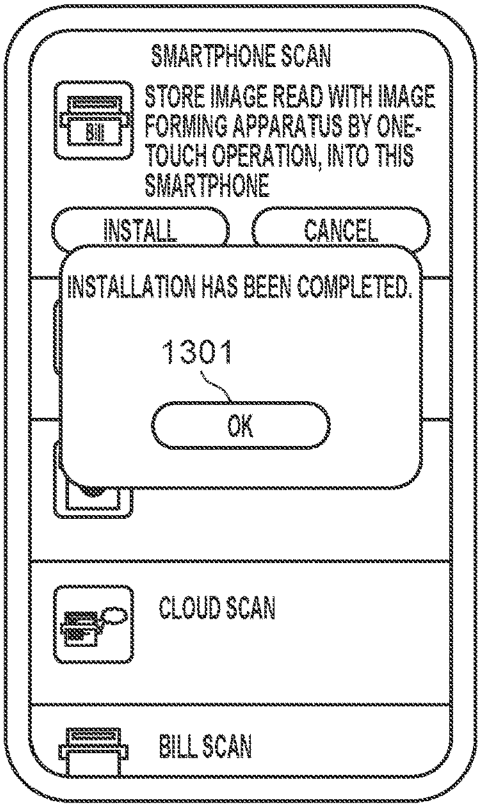

In a case where the installation is completed, the smartphone 102 displays an installation completion screen illustrated in FIG. 7D, on the operation unit 516. After that, in step S916, the smartphone 102 adds a smartphone scan application icon 1401 to the home screen as illustrated in FIG. 5B, and completes the processing. In a case where an OK button 1301 is pressed, the smartphone 102 displays the home screen illustrated in FIG. 5B.

Figure 8:
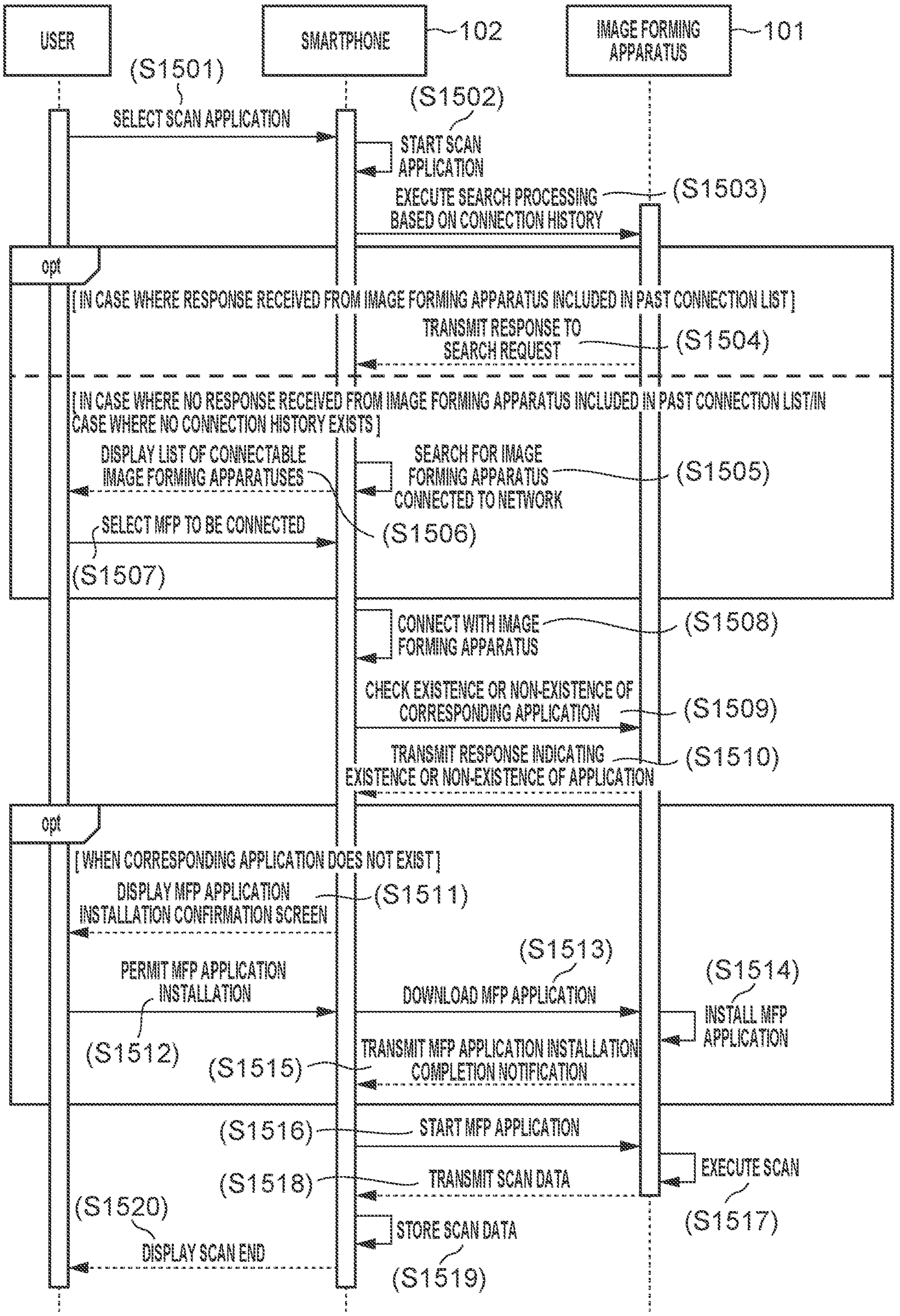
FIG. 8 is a diagram illustrating a sequence of a smartphone scan application started from the smartphone.

FIG. 8 illustrates a sequence of processing of starting an image forming apparatus cooperation application installed on the smartphone 102, and operating the image forming apparatus cooperation application in cooperation after installation. The description will be given using the smartphone scan application 621 as an example of an application. After the smartphone scan application 621 is started on the smartphone 102, the smartphone scan 423 installed on the image forming apparatus 101 is started and scan is performed. After the scan, the image forming apparatus 101 transmits scan data to the smartphone 102, and stores the scan data into the smartphone 102.

In a case where a touch operation on the smartphone scan application icon 1401 illustrated in FIG. 5B is received from the user in step S1501, the smartphone 102 is notified by the touch screen controller (not illustrated) of a coordinate of the pressed position. In a case where the CPU 511 of the smartphone 102 detects that the smartphone scan application icon 1401 has been selected, based on the coordinate included in the received notification, in step S1502, the CPU 511 starts the smartphone scan application 621.

In step S1503, the smartphone 102 searches an image forming apparatus connection history acquired from the smartphone scan application 621, for an image forming apparatus that is included in the connection history and is connected to the network 100 via the communication unit OF 523. The search for an image forming apparatus by the smartphone 102 is executed based on an application connection history using a multicast Domain Name System (mDNS) name and an internet protocol (IP) address. In a case where the smartphone 102 receives a response from an image forming apparatus (e.g., the image forming apparatus 101) during the search executed based on the connection history, the processing proceeds to step S1504. In a case where no response is received or in a case where the connection history does not exist, the processing proceeds to step S1505.

In step S1504, the image forming apparatus 101 included in the connection history of the smartphone scan application 621 transmits a response to a search request from the smartphone 102, and the processing proceeds to step S1507.

Figure 9A:
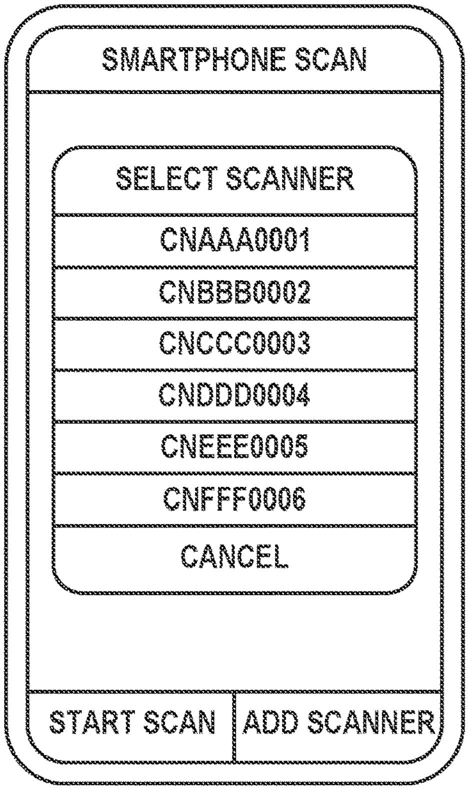
FIGS. 9A and 9B are diagrams each illustrating an operation screen related to the smartphone scan application on the smartphone.

In step S1505, the smartphone 102 searches for an image forming apparatus connected to the network 100 via the communication unit OF 523. In step S1506, the smartphone 102 displays a list of connectable image forming apparatuses that is illustrated in FIG. 9A, on the operation unit 516 (in this example, mDNS names are displayed).

In step S1507, in a case where the smartphone 102 detects an image forming apparatus (as an example, CNCCC0003) selected by the user, the processing proceeds to step S1508.

In step S1508, the smartphone 102 executes connection processing to establish communication with the image forming apparatus 101 whose mDNS name is CNCCC0003. In a case where the smartphone 102 connects with the image forming apparatus 101, in step S1509, the smartphone 102 checks whether the smartphone scan 423, which is an MFP application for connecting with the smartphone scan application 621, exists on the image forming apparatus 101.

In step S1510, the image forming apparatus 101 transmits a response indicating the existence or non-existence of the smartphone scan 423 being a corresponding MFP application, to the smartphone 102.

Figure 9B:
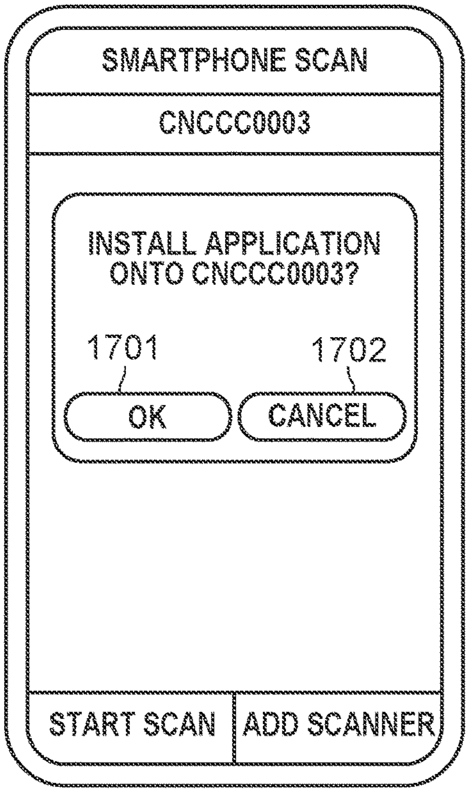

In a case where the smartphone scan 423 has not been installed onto the image forming apparatus 101 yet, in step S1511, the smartphone 102 displays a screen illustrated in FIG. 9B, on the operation unit 516, and waits for an operation to be performed by the user.

In step S1512, the smartphone 102 detects a pressing operation performed on an OK button 1701 and receives an installation permission operation from the user. In step S1513, the smartphone 102 downloads the smartphone scan 423 contained in the smartphone scan application 621, onto the image forming apparatus 101.

In step S1514, the image forming apparatus 101 installs the smartphone scan 423 received from the smartphone 102. In step S1515, the image forming apparatus 101 adds an icon of the smartphone scan 423 to the operation unit 216 of the image forming apparatus 101 and notifies the smartphone 102 of completion of the installation processing.

In step S1516, the image forming apparatus 101 starts the smartphone scan 423. In step S1517, the image forming apparatus 101 executes a scan operation. In step S1518, the image forming apparatus 101 transmits image data obtained by the scan operation, to the smartphone 102. In step S1519, the smartphone 102 stores the received scan data into a determined area in a storage. In step S1520, the smartphone 102 notifies the user of completion of the operation of the smartphone scan application 621.

Figure 10:
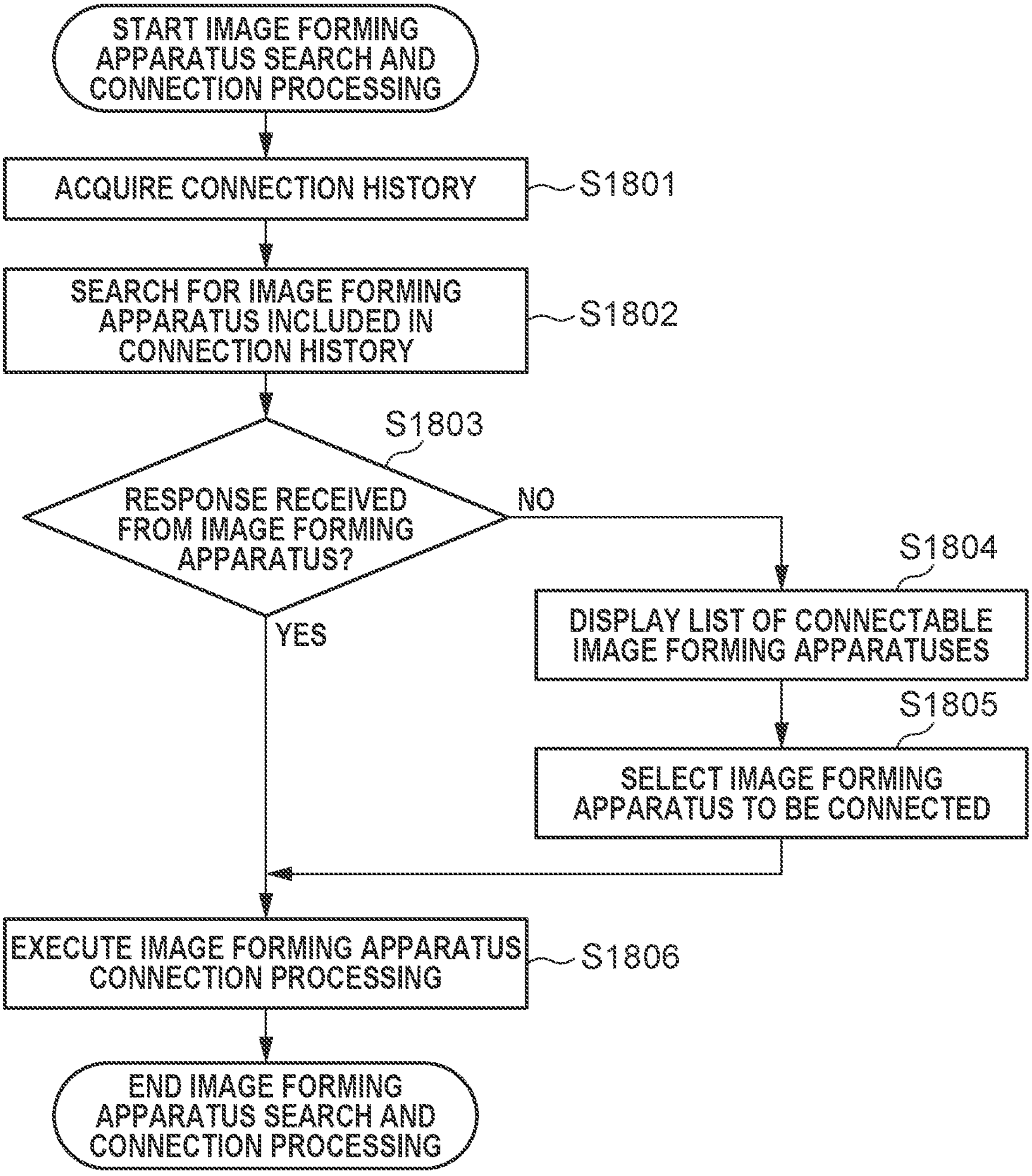
FIG. 10 is a diagram illustrating a procedure of connection processing of the smartphone and the image forming apparatus.

FIG. 10 illustrates details of connection processing of the smartphone 102 and the image forming apparatus 101 that is performed in steps S1503 to S1507 of FIG. 8.

In step S1801, the smartphone 102 checks an image forming apparatus connection history, and acquires an mDNS name and an IP address to be used in search.

In step S1802, the smartphone 102 searches for an image forming apparatus having an mDNS name and an IP address that coincide with the mDNS name and the IP address acquired from the connection history indicating an image forming apparatus that has previously connected to the network 100 via the communication unit OF 523. In step S1803, the smartphone 102 determines whether an image forming apparatus that has previously connected to the network 100 has been found as a search result. In a case where an image forming apparatus that has ever connected to the network 100 has been found (YES in step S1803), the processing proceeds to step S1806. In a case where an image forming apparatus that has ever connected to the network 100 has not been found (NO in step S1803), the processing proceeds to step S1804.

In step S1804, the smartphone 102 displays a list of image forming apparatuses found in the search, on the operation unit 516 as illustrated in FIG. 9A.

In step S1805, the smartphone 102 receives a selection of an image forming apparatus to be connected from among the displayed list.

The smartphone 102 acquires information regarding an mDNS name and an IP address of an image forming apparatus (as an example, the image forming apparatus 101) selected in step S1805 via the operation unit 516.

In step S1806, connection processing with the image forming apparatus is executed using the acquired mDNS name and the IP address. After completion of the connection processing, the processing illustrated in FIG. 10 ends.

Figure 11:
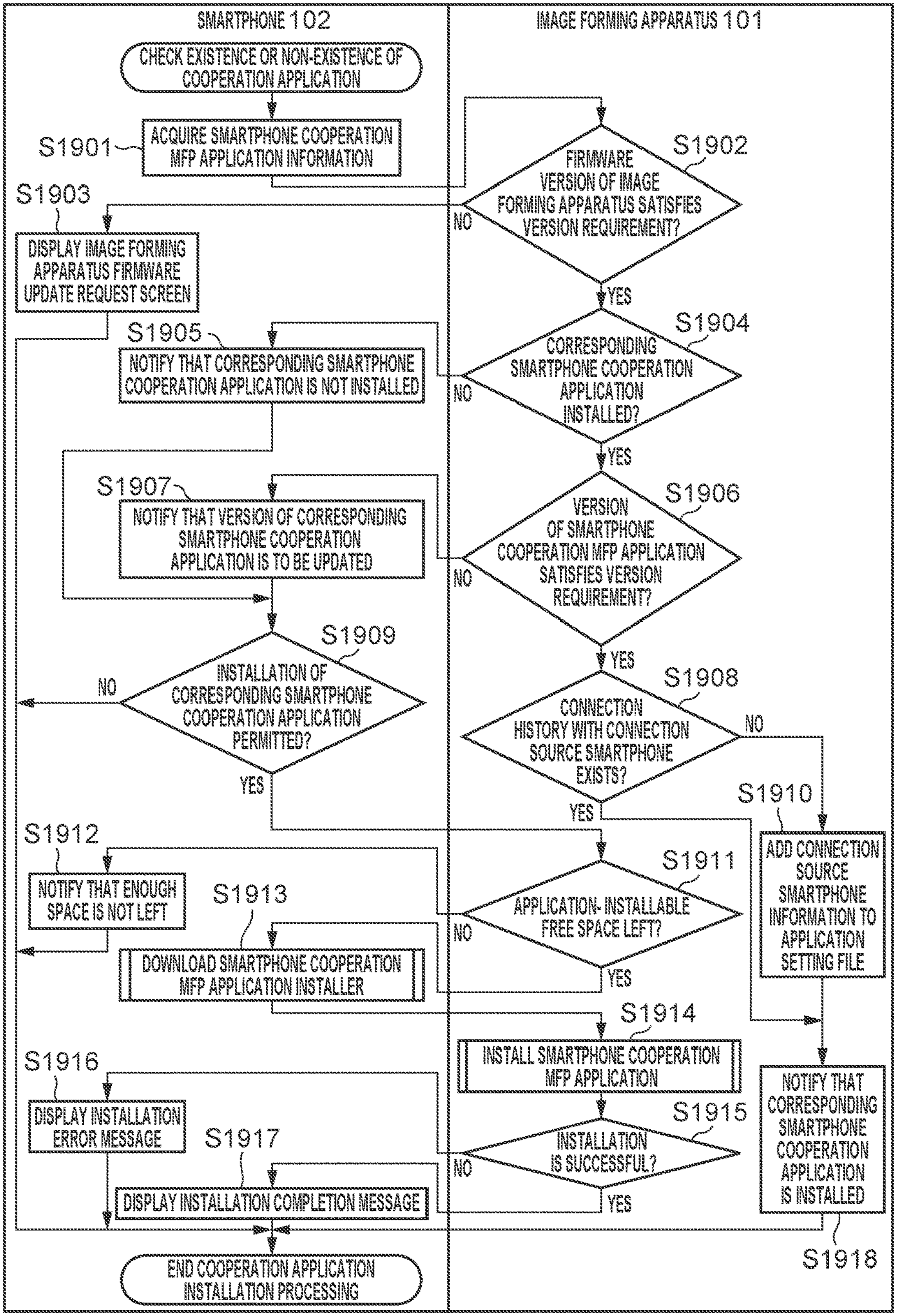
FIG. 11 is a diagram illustrating a procedure of version check and install processing of a smartphone cooperation application.

FIG. 11 illustrates details of processing in step S1509 or S1510 of FIG. 8 that is the version check and installation processing for the smartphone scan 423 being a smartphone cooperation application. In step S1901, the smartphone 102 acquires application information of the smartphone scan 423, which is a smartphone cooperation MFP application contained in the smartphone cooperation MFP application installer 811 in the smartphone application. The application information includes an application ID and a version of the smartphone scan application 621 and the smartphone scan 423 contained in the corresponding installer, and a corresponding firmware version of the image forming apparatus 101.

In step S1902, the image forming apparatus 101 checks whether the firmware version satisfies a version requirement for the smartphone scan application 621 and the smartphone scan 423.

Figure 12A:
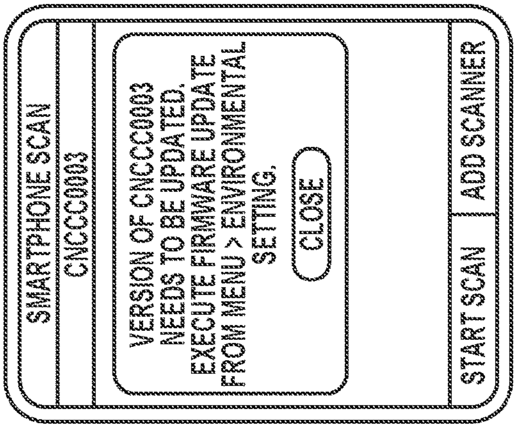
FIGS. 12A to 12E are diagrams each illustrating an operation screen related to the smartphone scan application on the smartphone.

In a case where the version requirement is not satisfied (NO in step S1902), the processing proceeds to step S1903. In step S1903, the smartphone 102 displays a screen illustrated in FIG. 12A indicating that a firmware version of the image forming apparatus 101 needs to be updated, on the operation unit 516, and ends the processing. In a case where the version condition is satisfied (YES in step S1902), the processing proceeds to step S1904. In step S1904, the image forming apparatus 101 checks whether the smartphone scan 423 corresponding to the smartphone scan application 621 has been installed, based on application information of the smartphone scan application 621.

In a case where the smartphone scan 423 has not been installed (NO in step S1904), the processing proceeds to step S1905. In step S1905, the smartphone 102 displays a screen illustrated in FIG. 9B indicating that the smartphone scan 423 has not been installed, on the operation unit 516, and the processing proceeds to step S1909.

In step S1906, the image forming apparatus 101 checks whether a version of the smartphone scan 423 which has been installed satisfies the version requirement. In a case where the version satisfies the version requirement (YES in step S1906), the processing proceeds to step S1908. In a case where the version does not satisfy the version requirement (NO in step S1906), the processing proceeds to step S1907. In step S1908, the image forming apparatus 101 checks whether a connection history with the smartphone 102 as a connection source smartphone exists. In a case where the image forming apparatus 101 has a connection history with the connection source smartphone (YES in step S1908), the processing proceeds to step S1918. In a case where the image forming apparatus 101 has no connection history with the connection source smartphone (NO in step S1908), the processing proceeds to step S1910. In step S1907, the smartphone 102 notifies that the version of the smartphone scan 423 being a corresponding smartphone cooperation application is to be updated, and the processing proceeds to step S1909. In step S1907, the smartphone 102 displays a screen illustrated in FIG. 12B that indicates that the version of the smartphone scan 423 is inappropriate, on the operation unit 516, and the processing proceeds to step S1909. In step S1909, the smartphone 102 determines whether the OK button 1701 on the screen illustrated in FIG. 9B that has been displayed in step S1905, or an install button 2101 on the screen illustrated in FIG. 12B that has been displayed in step S1907 has been pressed. In a case where the OK button 1701 or the install button 2101 is pressed (YES in step S1909), the processing proceeds to step S1911.

Figure 12B:
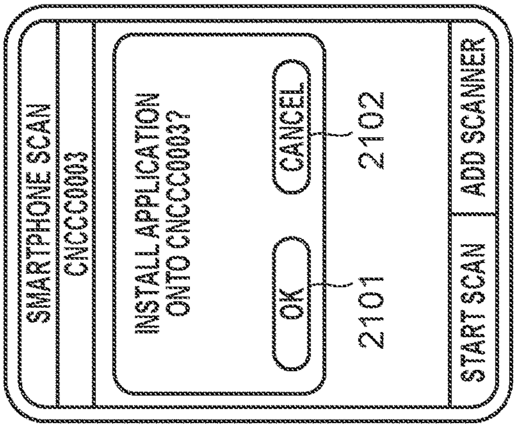

In a case where a cancel button 1702 illustrated in FIG. 9B or a cancel button 2102 illustrated in FIG. 12B is pressed (NO in step S1909), the smartphone 102 ends the processing.

In step S1910, the image forming apparatus 101 adds connection source smartphone information to an application setting file, and the processing proceeds to step S1918. In step S1911, the image forming apparatus 101 checks whether the smartphone scan 423 being a smartphone cooperation application included in the notification is installable, based on the size of the smartphone scan 423 and a free space in the storage 514.

In a case where the smartphone scan 423 is not installable (NO in step S1911), the processing proceeds to step S1912. In step S1912, the smartphone 102 displays a message illustrated in FIG. 12C that indicates that the smartphone scan 423 is not installable, on the operation unit 516, and completes the processing. In a case where whether the smartphone scan 423 is installable (YES in step S1911), the processing proceeds to step S1913. In step S1913, the smartphone 102 downloads an installer of a smartphone cooperation MFP application to be used by the image forming apparatus 101.

In step S1914, the image forming apparatus 101 loads the installer downloaded from the smartphone 102 onto the RAM 213, executes the installer, and installs the smartphone cooperation MFP application onto the storage 514. After completion of the installation, the processing proceeds to step S1915. In step S1915, the image forming apparatus 101 checks whether the installation is successful. In a case where the installation has failed (NO in step S1915), the processing proceeds to step S1916. In step S1916, the smartphone 102 displays a message illustrated in FIG. 12D indicating a failure in the installation, together with an error code indicating a cause of the installation failure, on the operation unit 516, and ends the processing.

In a case where the installation is successful (YES in step S1915), the processing proceeds to step S1917. In step S1917, the smartphone 102 displays a message illustrated in FIG. 12E indicating that the installation of the smartphone cooperation MFP application is successful, on the operation unit 516, and ends the processing. In step S1918, the image forming apparatus 101 notifies the smartphone 102 that an appropriate cooperation application has been installed, and ends the processing.

Figure 13:
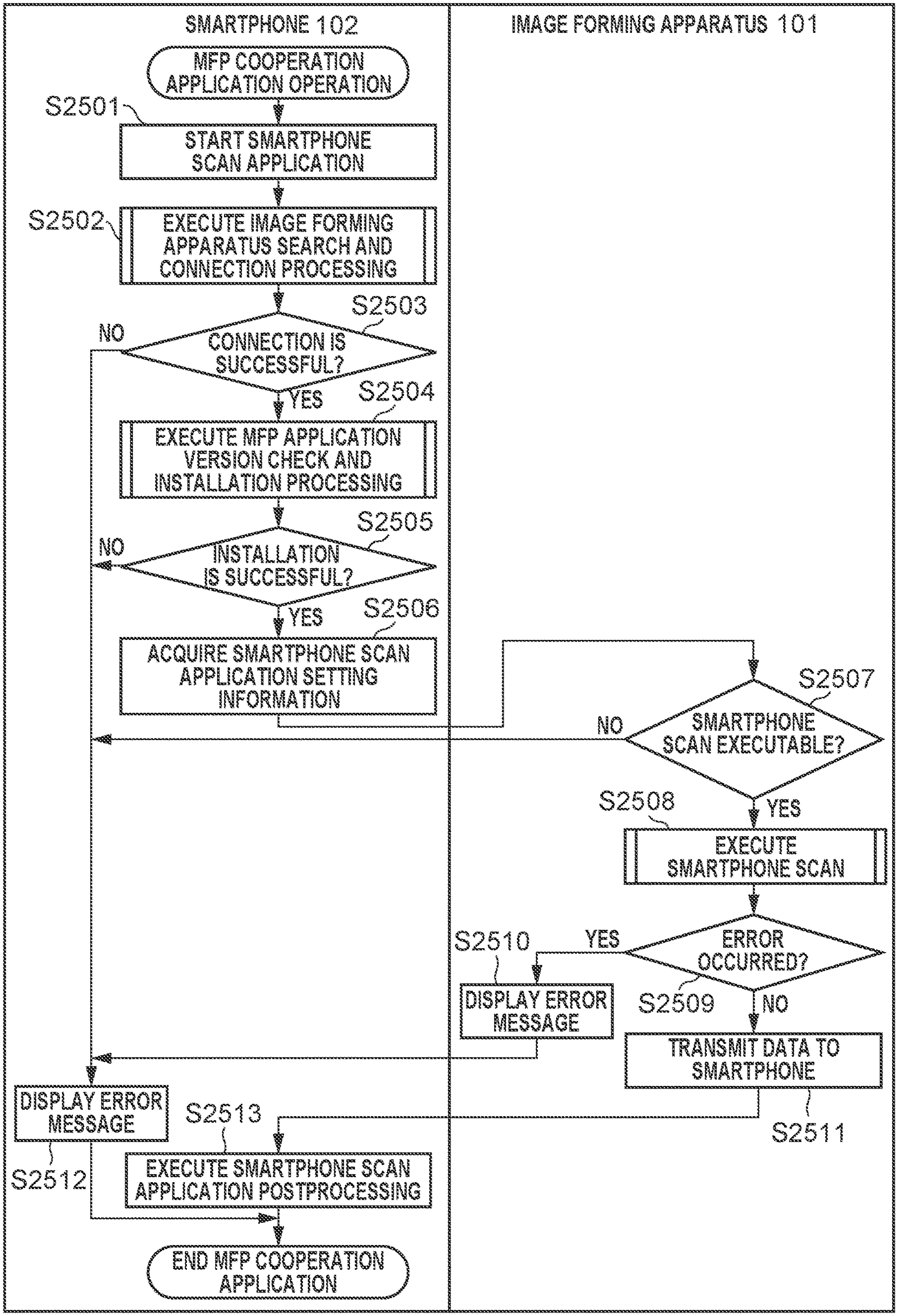
FIG. 13 is a diagram illustrating a detailed procedure of a sequence of the smartphone scan application started from the smartphone.

FIG. 13 illustrates a detailed procedure of the processing illustrated in FIG. 8. In a case where the smartphone 102 detects that the smartphone scan application icon 1401 that is for cooperation with the image forming apparatus 101 and displayed on the operation unit 516 is pressed, in step S2501, the smartphone 102 starts the smartphone scan application 621.

In step S2502, the smartphone 102 performs a search for the image forming apparatus 101 and connection processing of the image forming apparatus 101 that has been described with reference to FIG. 10. In step S2503, the smartphone 102 checks a result of the image forming apparatus search and connection processing and determines whether the connection is successful. In a case where the connection is successful (YES in step S2503), the processing proceeds to step S2504. In a case where the connection is not successful (NO in step S2503), the processing proceeds to step S2512.

In step S2504, the smartphone 102 performs communication connection to the smartphone scan 423 being the smartphone cooperation MFP application, the application version check, the application existence or non-existence check, the download processing, and the installation processing, which have been described with reference to FIG. 11. In step S2505, the smartphone 102 checks whether the installation processing in step S2504 is successful. In a case where the installation processing is successful (YES in step S2505), the processing proceeds to step S2506. In a case where the installation processing is not successful (NO in step S2505), the processing proceeds to step S2512.

In step S2506, the smartphone 102 acquires setting information of the smartphone scan application 621, and notifies the smartphone scan 423 of the image forming apparatus 101 of the setting information. In step S2507, the image forming apparatus 101 checks whether the smartphone scan 423 is executable, based on the setting information included in the notification received from the smartphone 102, and the state of the image forming apparatus 101.

Figure 14A:
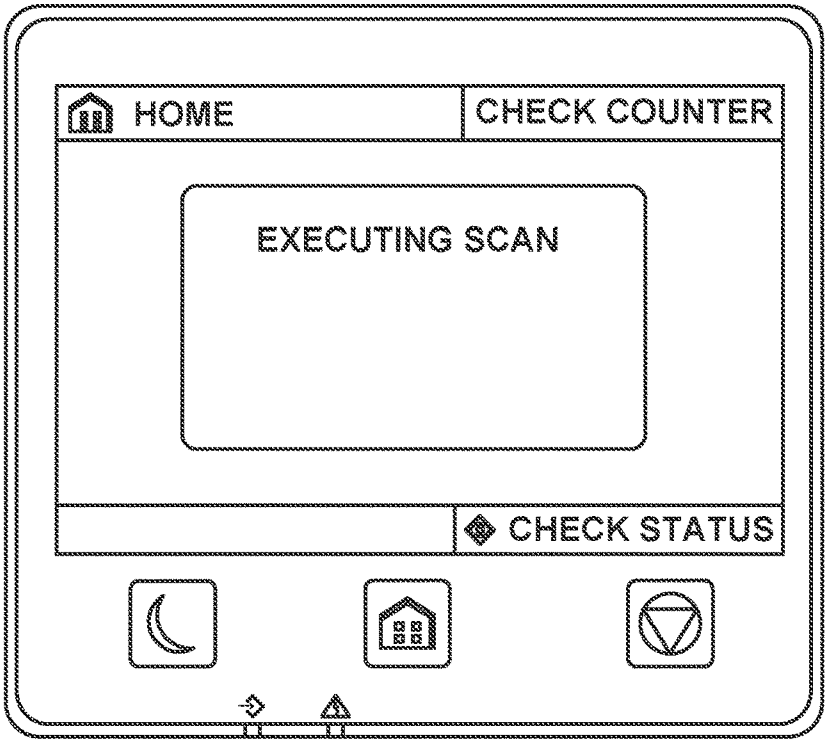
FIGS. 14A and 14B are diagrams each illustrating an operation screen related to the smartphone scan application on the image forming apparatus.

In a case where the smartphone scan 423 is executable (YES in step S2507), the processing proceeds to step S2508. In step S2508, the image forming apparatus 101 displays a scan executing screen illustrated in FIG. 14A, on the operation unit 216, and executes the smartphone scan 423 in accordance with the setting information acquired from the smartphone 102.

Figure 14B:
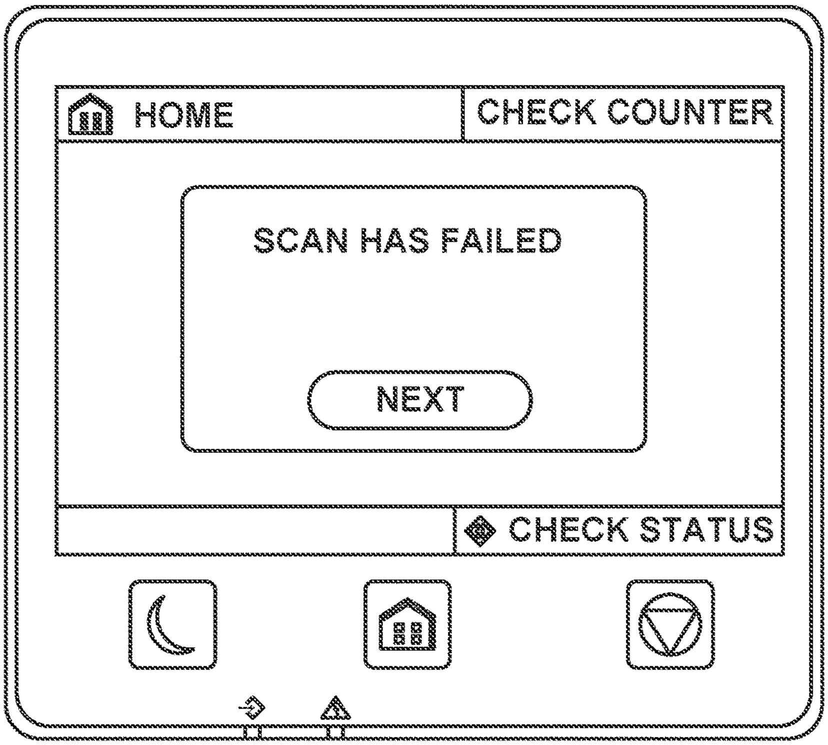

In step S2509, the image forming apparatus 101 determines whether an error has occurred when the smartphone scan 423 ends. In a case where the smartphone scan 423 has normally ended (NO in step S2509), the processing proceeds to step S2511. In a case where abnormality has been detected (YES in step S2509), the processing proceeds to step S2510. In step S2510, the image forming apparatus 101 notifies the smartphone 102 of an error by displaying a screen illustrated in FIG. 14B, on the operation unit 216 in accordance with the type of the error.

In step S2511, the image forming apparatus 101 transmits data, such as an execution result and a scan image, to the smartphone 102 in accordance with processing of the smartphone scan 423.

Figure 15A:
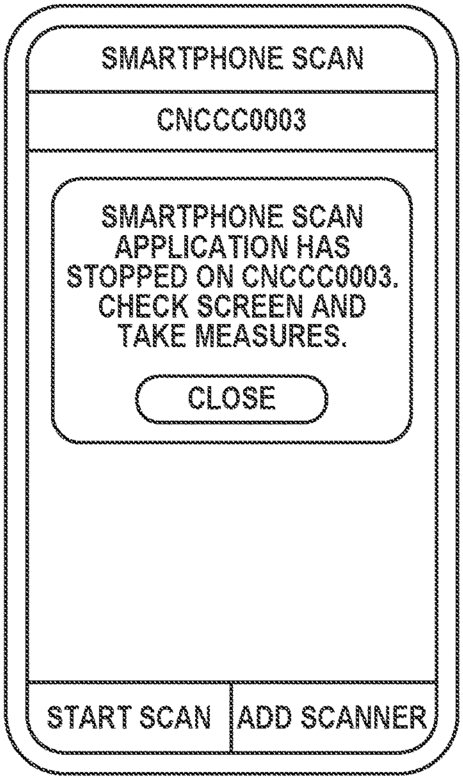
FIGS. 15A and 15B are diagrams each illustrating an operation screen related to the smartphone scan application on the smartphone.
Figure 15B:
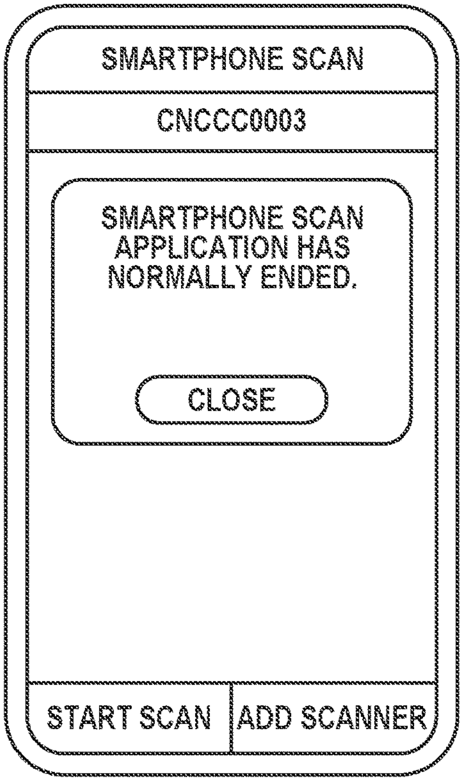

In step S2513, the smartphone 102 executes postprocessing based on the execution result included in the data transmitted by the smartphone scan application 621 from the image forming apparatus 101. After completion of the postprocessing, the smartphone 102 displays a completion screen illustrated in FIG. 15B, on the operation unit 516, and ends the processing.

In a case where it is determined in step S2507 that the smartphone scan 423 is not executable (NO in step S2507), the processing proceeds to step S2512. In step S2512, the smartphone 102 displays the screen illustrated in FIG. 15A, on the operation unit 516 in accordance with the error received from the image forming apparatus 101, and ends the processing.

Figure 16:
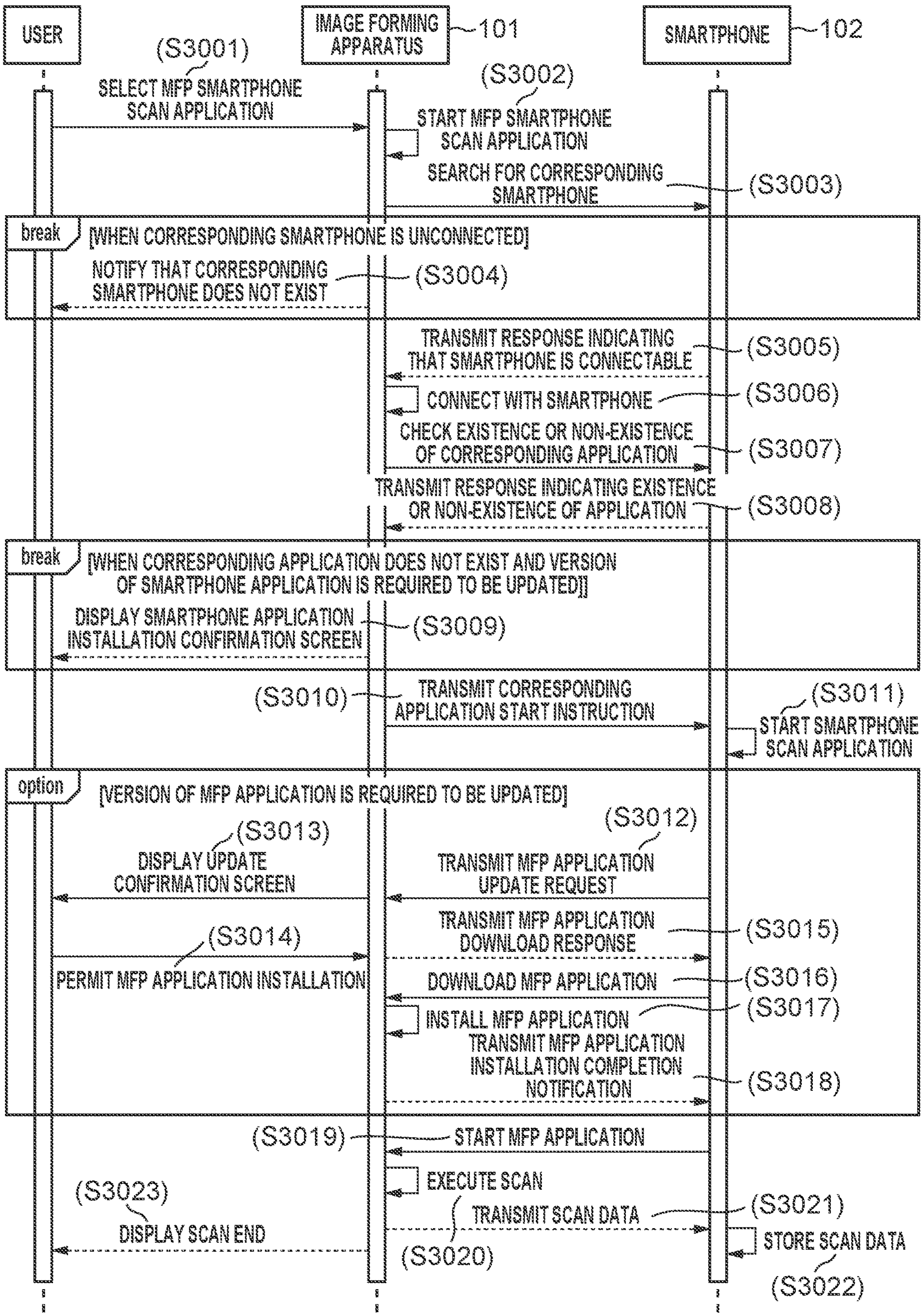
FIG. 16 is a diagram illustrating a sequence of processing that is performed in a case where the smartphone scan application is started and operated from the image forming apparatus.
Figure 17A:
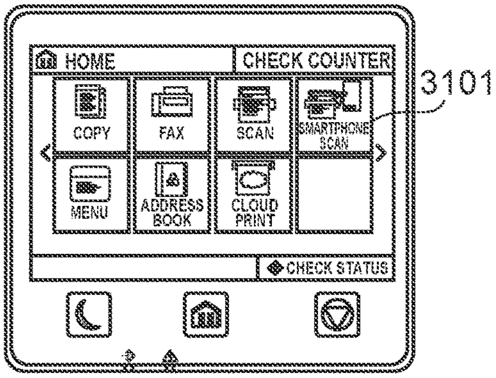
FIGS. 17A to 17G are diagrams each illustrating an operation screen related to the smartphone scan application on the image forming apparatus.

FIG. 16 illustrates a sequence of processing in which the smartphone cooperation application installed on the image forming apparatus 101 is started and then operates in cooperation with the smartphone 102. The description will be given using the smartphone scan 423 as an example of the application. After completion of the installation of the smartphone scan 423 in step S1914 of FIG. 11, a smartphone scan icon 3101 is added to a home screen of the operation unit 216 of the image forming apparatus 101 as illustrated in FIG. 17A. After the smartphone scan 423 is started on the image forming apparatus 101, the smartphone scan application 621 on an install source is started, and scan is executed in accordance with an instruction issued from the smartphone scan application 621 to the smartphone scan 423. After that, the image forming apparatus 101 transfers scan data to the smartphone 102 and stores the scan data into the smartphone 102, and ends the processing.

In step S3001, the image forming apparatus 101 detects that the smartphone scan icon 3101 which has been added to the home screen of the operation unit 216 as an icon of the MFP cooperation smartphone application is touched, and the processing proceeds to step S3002. In step S3002, the image forming apparatus 101 starts the smartphone scan 423. After the startup of the smartphone scan 423, in step S3003, the smartphone scan 423 acquires an mDNS name and an IP address of a connection source, which is the smartphone 102, from the storage 214, and searches for the smartphone 102 connected to the network 100 via the communication unit OF 223.

Figure 17B:
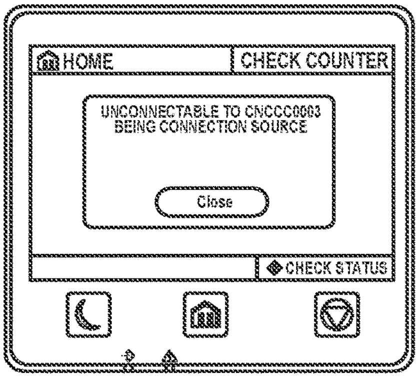

In a case where no smartphone is found as a result of the search, in step S3004, the image forming apparatus 101 displays an error message illustrated in FIG. 17B that indicates that the smartphone 102 being a connection source does not exist, on the operation unit 216, and ends the processing. In a case where the smartphone 102 being a connection source is connected to the network 100 and is connectable to the image forming apparatus 101, in step S3005, the smartphone 102 transmits a response indicating that the smartphone 102 is connectable to the image forming apparatus 101. In step S3006, the image forming apparatus 101 executes connection processing with the smartphone 102. In a case where the connection processing is successful, in step S3007, the image forming apparatus 101 checks the existence or non-existence of a corresponding application. In step S3008, the smartphone 102 transmits a response indicating the existence or non-existence of the smartphone scan application 621.

Figure 17C:
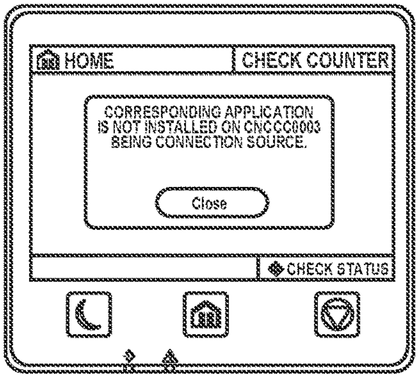
Figure 17D:
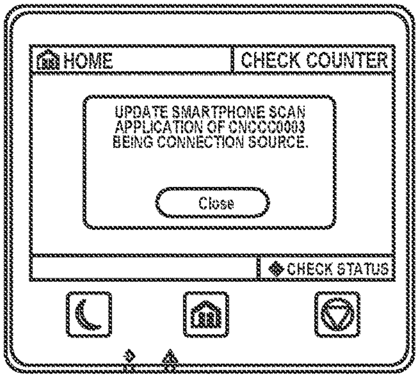

In a case where the smartphone scan application 621 does not exist on the smartphone 102, or the smartphone scan application 621 needs to be updated, in step S3009, the image forming apparatus 101 displays an installation confirmation screen illustrated in FIG. 17C or an update screen illustrated in FIG. 17D, on the operation unit 216 of the image forming apparatus 101.

In a case where the smartphone scan application 621 is installed on the smartphone 102, and the version is appropriate, in step S3010, the image forming apparatus 101 issues a start instruction of the smartphone scan application 621 being a corresponding application.

In step S3011, the smartphone 102 starts the smartphone scan application 621, and checks the version of the smartphone scan 423.

In a case where the update is to be performed, the processing proceeds to step S3012. In a case where the update is not to be performed, the processing proceeds to step S3020.

In a case where the update is to be performed, in step S3012, the smartphone 102 transmits an update request for the smartphone scan 423 to the image forming apparatus 101.

Figure 17E:
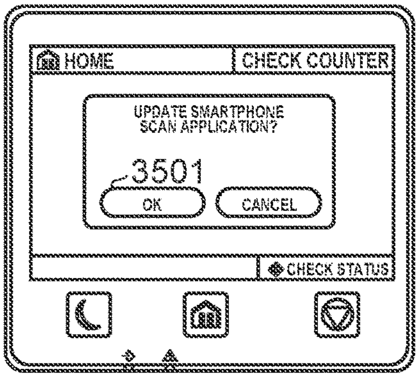

In step S3013, in response to the MFP application update request, the image forming apparatus 101 displays an update confirmation screen illustrated in FIG. 17E, on the operation unit 216. In step S3014, in a case where the user gives update permission by pressing an OK button 3501, the processing proceeds to step S3015. In step S3015, the image forming apparatus 101 transmits a download response of the smartphone scan 423 to the smartphone 102.

In step S3016, the smartphone scan 423 contained in the smartphone scan application 621 is downloaded onto the image forming apparatus 101. In step S3017, the image forming apparatus 101 installs the smartphone scan 423. In step S3018, the image forming apparatus 101 notifies the smartphone 102 of completion of the installation.

Figure 17F:
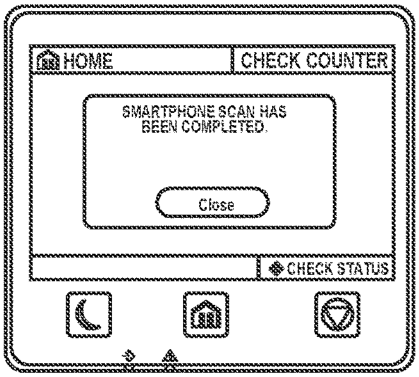

In step S3019, the image forming apparatus 101 starts the smartphone scan 423. In step S3020, the image forming apparatus 101 executes a scan operation. In step S3021, the image forming apparatus 101 transmits image data obtained by the scan operation to the smartphone 102. In step S3022, the smartphone 102 stores the image data. After completion of the scan data transfer, in step S3023, the image forming apparatus 101 displays a message illustrated in FIG. 17F that indicates a scan end, on the operation unit 216, and ends the processing.

Figure 18A:
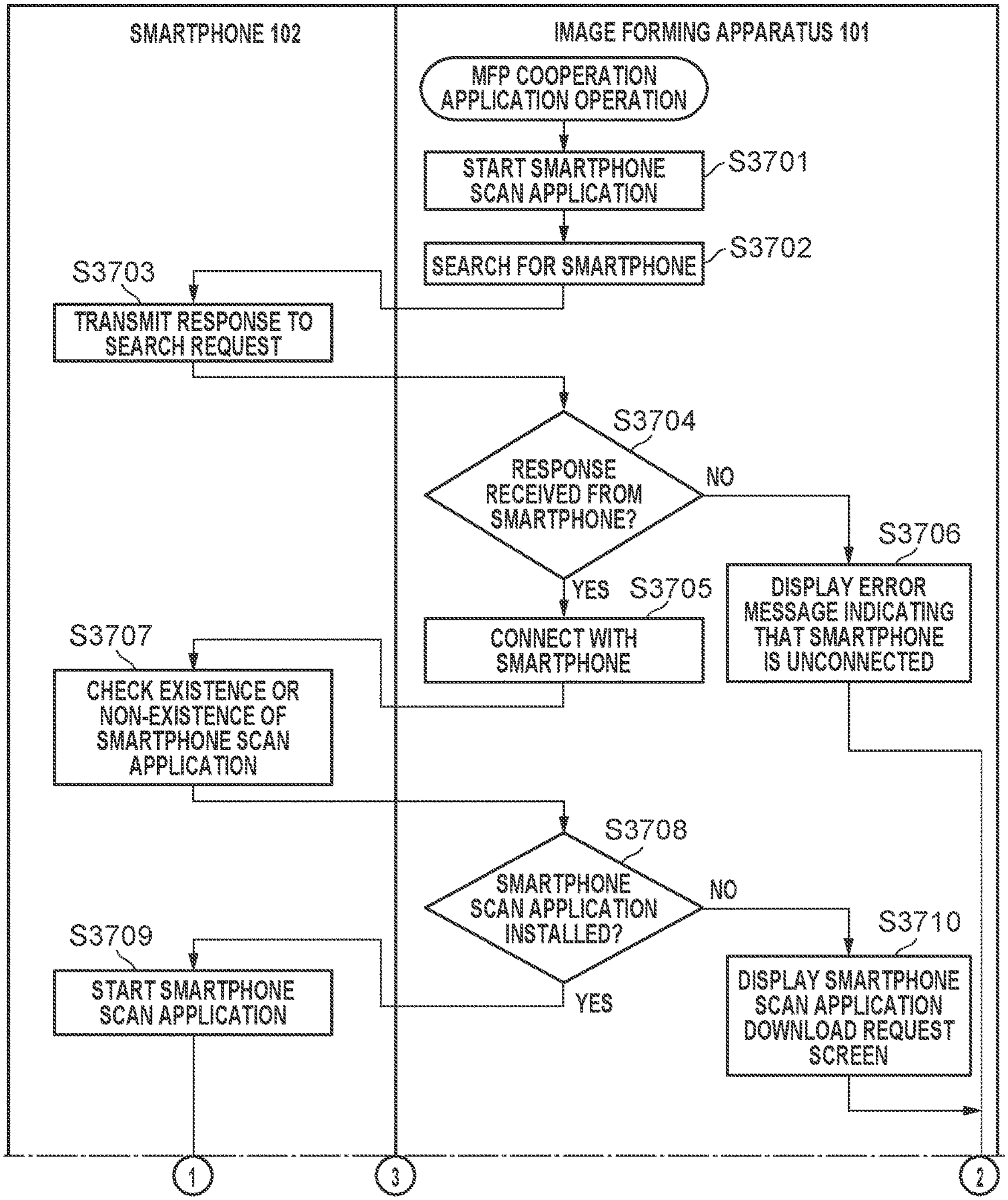
FIGS. 18A and 18B are diagrams illustrating a detailed procedure of processing to be performed in a case where the smartphone scan application is started and operated from the image forming apparatus.
Figure 18B:
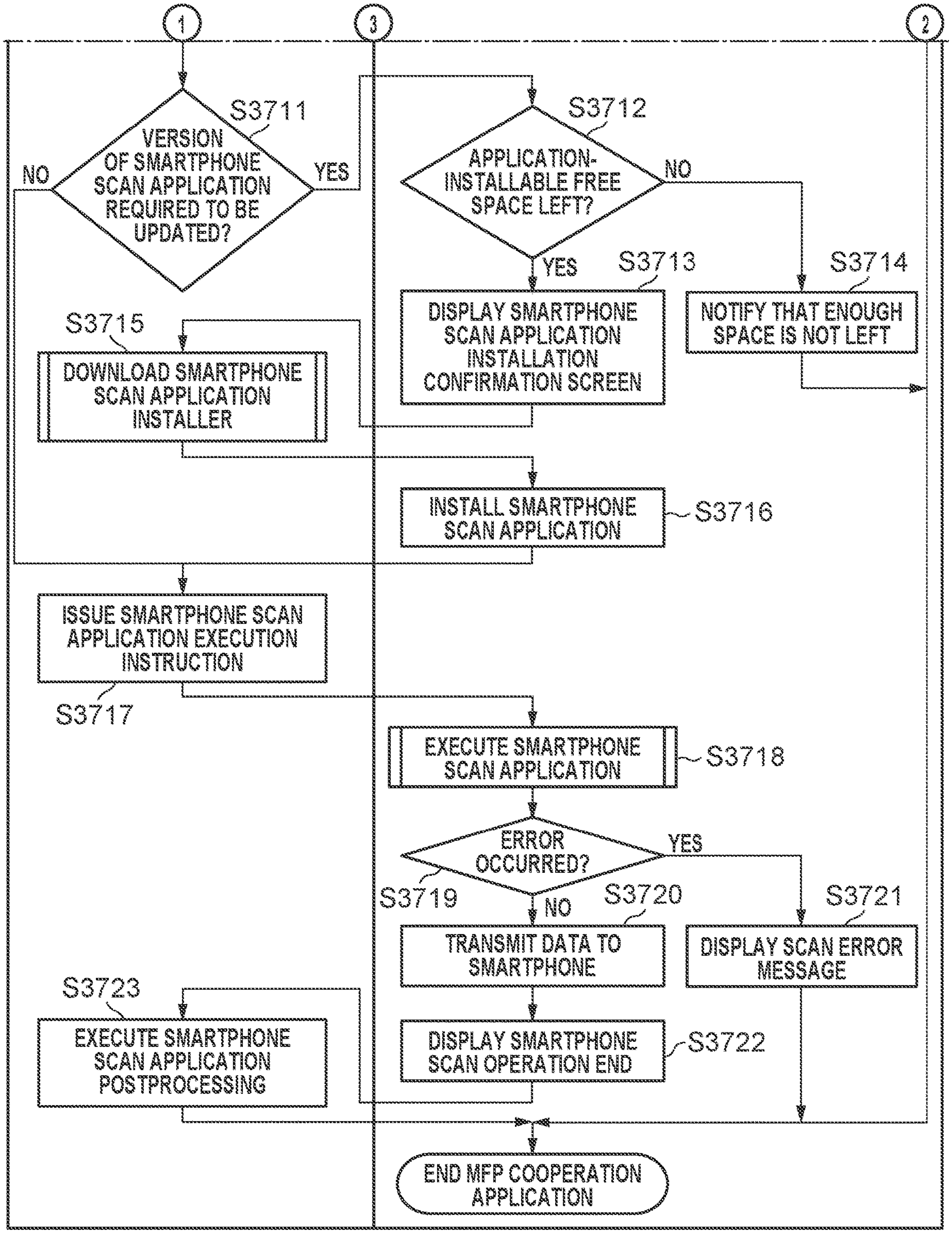

FIGS. 18A and 18B illustrate a detailed procedure of the processing illustrated in FIG. 16. In a case where the image forming apparatus 101 detects that the smartphone scan icon 3101 has been pressed via the operation unit 216, in step S3701, the image forming apparatus 101 starts the smartphone scan 423. In step S3702, the image forming apparatus 101 searches for a connection source smartphone connected to the network 100 to which the image forming apparatus 101 is connected, based on an mDNS name and an IP address, which are information regarding the connection source smartphone that has been acquired by the smartphone scan 423.

In a case where the smartphone 102 receives a search request from the image forming apparatus 101, in step S3703, the smartphone 102 transmits a response to the search request to the image forming apparatus 101. In step S3704, the image forming apparatus 101 checks whether a response has been received from the smartphone 102. In a case where a response has been received from the smartphone 102 (YES in step S3704), the processing proceeds to step S3705. In a case where no response has been received from the smartphone 102 (NO in step S3704), the processing proceeds to step S3706. In step S3706, the image forming apparatus 101 displays the error message illustrated in FIG. 17B, on the operation unit 216, and ends the processing.

In step S3705, the image forming apparatus 101 establishes connection with the smartphone 102 via the communication unit OF 223, and then checks whether a corresponding smartphone application exits on the smartphone 102. In step S3707, the smartphone 102 checks the existence or non-existence of the smartphone scan application 621 being a corresponding smartphone application, and notifies the image forming apparatus 101 of a check result. In step S3708, the image forming apparatus 101 checks the result of checking whether the smartphone scan application 621 is installed on the smartphone 102. In a case where the smartphone scan application 621 is not installed (NO in step S3708), the processing proceeds to step S3710. In step S3710, the image forming apparatus 101 displays a download request screen for the smartphone scan application 621, and ends the processing.

In a case where the smartphone scan application 621 is installed (YES in step S3708), the processing proceeds to step S3709. In step S3709, the smartphone 102 starts the smartphone scan application 621 being a corresponding smartphone scan application. In step S3711, the smartphone 102 checks whether the version of the smartphone scan 423 being an MFP application included in the notification received from the image forming apparatus 101 is required to be updated. In a case where a version update is required (YES in step S3711), the processing proceeds to step S3712. In a case where a version update is not required (NO in step S3711), the processing proceeds to step S3717.

Figure 17G:
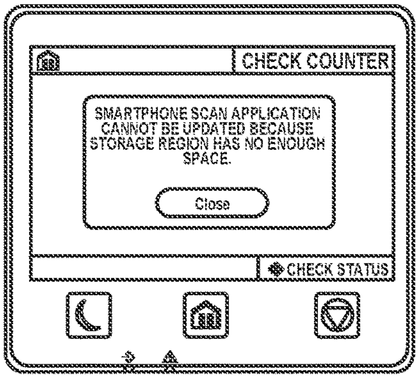

In a case where a version update is required (YES in step S3711), in step S3712, the image forming apparatus 101 checks whether the version update is able to be performed, based on the size of the smartphone scan 423 included in the notification, and a free space in the storage 214. Specifically, the image forming apparatus 101 checks whether a predetermined space (threshold) is left. In a case where the version update is able to be performed (YES in step S3712), the processing proceeds to step S3713. In a case where the version update is not able to be performed because no enough free space is left (NO in step S3712), the processing proceeds to step S3714. In step S3714, the image forming apparatus 101 displays a message illustrated in FIG. 17G that indicates that the version of the smartphone scan 423 cannot be updated because an enough free space has left, on the operation unit 216, and ends the processing.

In step S3713, the image forming apparatus 101 displays an MFP application version update confirmation screen illustrated in FIG. 17E, on the operation unit 216. In a case where the OK button 3501 is pressed, the image forming apparatus 101 issues an MFP application download request to the smartphone 102. In step S3715, the smartphone 102 downloads an installer of the smartphone scan 423 contained in the smartphone scan application 621, onto the image forming apparatus 101. In the present embodiment, reinstallation of the smartphone scan 423 will be described, but an installer for updating data can be used.

In step S3716, the image forming apparatus 101 loads the downloaded installer of the smartphone scan 423 from the smartphone 102 onto the RAM 213, and installs the application onto the storage 214. After completion of the installation, the image forming apparatus 101 notifies the smartphone 102 of the completion. In step S3717, the smartphone 102 issues an execution instruction of the smartphone scan 423 to the image forming apparatus 101. In step S3718, in response to the execution instruction from the smartphone 102, the image forming apparatus 101 displays the scan executing screen illustrated in FIG. 14A, on the operation unit 216, and executes the smartphone scan 423.

In step S3719, the image forming apparatus 101 checks a scan execution result and determines whether an error has occurred. In a case where no error has occurred (NO in step S3719), the processing proceeds to step S3720. In a case where an error has occurred (YES in step S3719), the processing proceeds to step S3721. In step S3721, the image forming apparatus 101 displays the error occurrence screen illustrated in FIG. 14B, on the operation unit 216, and ends the processing. In step S3720, the image forming apparatus 101 transmits acquired scan data of the smartphone scan 423 to the smartphone 102. After completion of the transmission, the processing proceeds to step S3722. In step S3722, the image forming apparatus 101 displays the screen illustrated in FIG. 17F that indicates the end of the smartphone scan 423, on the operation unit 216. In step S3723, the smartphone 102 processes the data transmitted from the image forming apparatus 101 with the MFP cooperation smartphone application. After completion of the data processing, the smartphone 102 displays the screen illustrated in FIG. 15B that indicates the completion of the application processing, on the operation unit 516, and ends the processing.

As described above, the image forming apparatus 101 connects with an MFP cooperation smartphone application installed on the smartphone 102 connected via the communication unit OF 223 and the network 100. Then, in a case where a smartphone cooperation MFP application contained in the MFP cooperation smartphone application is not installed on the image forming apparatus 101, the image forming apparatus 101 downloads the installer of the smartphone cooperation MFP application onto the image forming apparatus 101. After completion of the download of the installer of the smartphone cooperation MFP application, the image forming apparatus 101 executes installation of the application. After completion of the installation, the image forming apparatus 101 can install an application for an image forming apparatus, without connecting to an application service server for an image forming apparatus.

The MFP cooperation smartphone application installed on the smartphone 102 via the communication at the time of startup checks the version of the smartphone cooperation MFP application installed on the image forming apparatus 101. The smartphone 102 and the image forming apparatus 101 are thus able to keep a combination of appropriate versions.

In addition, the MFP cooperation smartphone application installed on the smartphone 102 is able to start and operate the smartphone cooperation MFP application installed on the image forming apparatus 101. By storing information regarding connection between the smartphone 102 and the image forming apparatus 101 at the time of installation, the smartphone cooperation MFP application is able to directly connect to the smartphone 102 being the installation source from the image forming apparatus 101.

The smartphone cooperation MFP application installed on the image forming apparatus 101 checks the version of the MFP cooperation smartphone application installed on the smartphone 102 via the communication at the time of startup. The smartphone cooperation MFP application is able to perform notification indicating whether the version of the MFP cooperation smartphone application to be provided from the image forming apparatus 101 needs to be updated.

In the present embodiment, a configuration of transmitting a scan image obtained by the reading unit 218 of the image forming apparatus 101 to the MFP cooperation smartphone application on the smartphone 102 has been described as an example. Aside from this, a configuration of displaying an operation of the printing unit 220 of the image forming apparatus 101 that is to be performed in response to a print instruction issued from the MFP cooperation smartphone application, and an operation result of the printing unit 220, on the operation unit 216, by notifying the smartphone 102 of these can be employed.

The smartphone cooperation MFP application installed on the image forming apparatus 101 can start an MFP cooperation smartphone application on the smartphone 102, select an image to be output, download the image, and output the image from the printing unit 220.

In the present embodiment, the description has been given using an application of the image forming apparatus 101 and an installer, but the present embodiment is also applicable to information processing apparatuses that are connectable with the smartphone 102.

In the first embodiment, a smartphone cooperation MFP application is installed onto the storage 214, and the image forming apparatus 101 executes the smartphone cooperation MFP application only by starting the smartphone cooperation MFP application when the smartphone cooperation MFP application is used for a second time or later. In a second embodiment, a function is implemented by loading a smartphone cooperation MFP application on the RAM 213 of the image forming apparatus 101.

Figure 19:
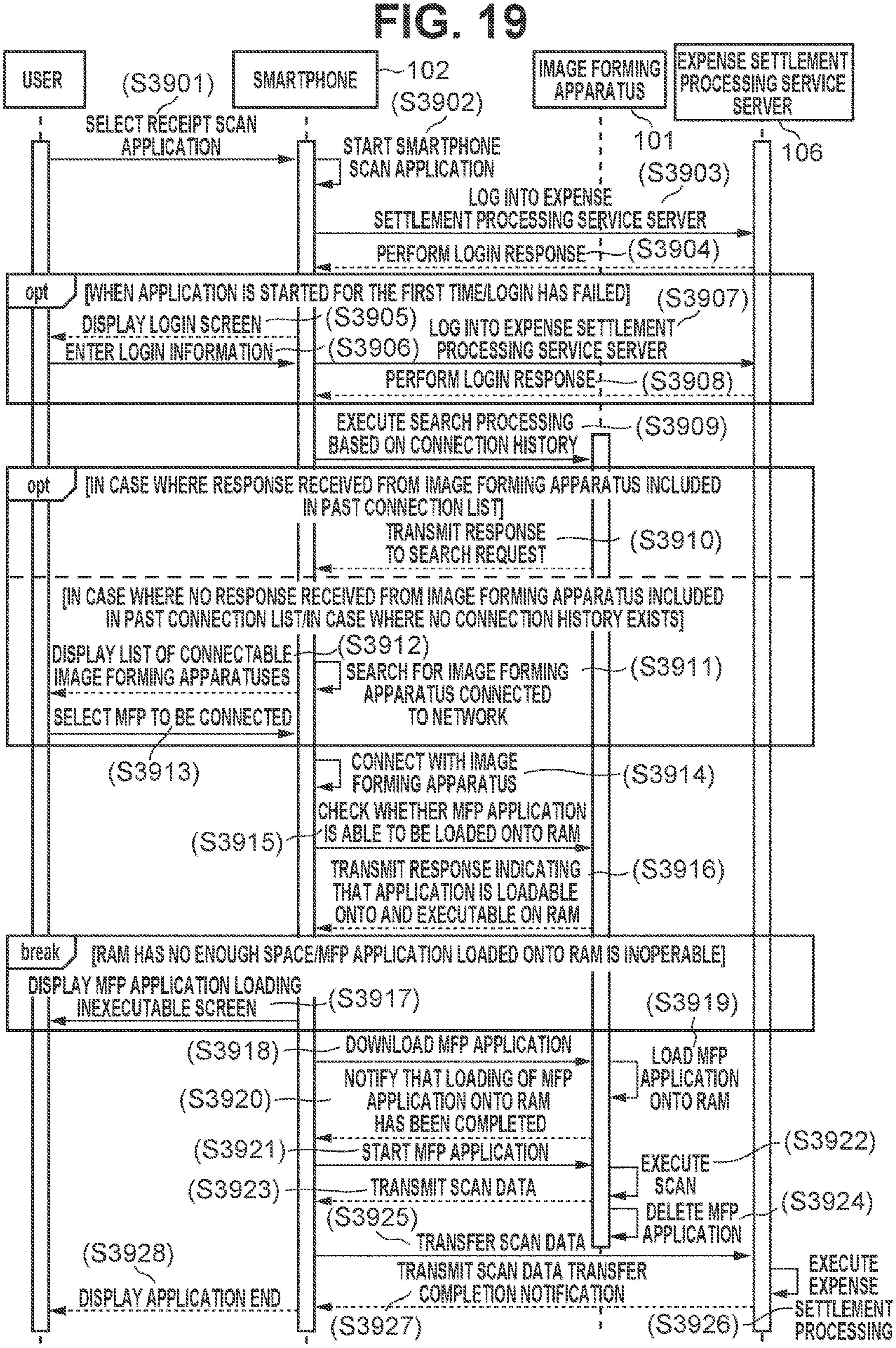
FIG. 19 is a diagram illustrating a sequence of processing of loading a receipt scan application onto a random access memory (RAM) of the image forming apparatus.

FIG. 19 is a diagram illustrating a sequence of processing that is performed in a case where a smartphone cooperation MFP application is loaded on the RAM 213 of the image forming apparatus 101 and operated. The smartphone cooperation MFP application in FIG. 19 is set to be loaded on the RAM 213 without being installed on the storage 214 of the image forming apparatus 101 and operate. The receipt scan application 620 and the receipt scan 424 are used as examples of an application to be described with reference to FIG. 19.

In step S3901, the smartphone 102 receives a selection of the receipt scan application icon 705 added to the home screen illustrated in FIG. 5A. The smartphone 102 detects a coordinate of a position being pressed, based on a notification from a touch screen controller (not illustrated). In step S3902, the CPU 511 of the smartphone 102 detects that the receipt scan application 620 is selected, based on the detected coordinate. Thus, the receipt scan application 620 is started. After startup of the receipt scan application 620, in step S3903, the smartphone 102 connects to the expense settlement processing service server 106 from the communication unit OF 523 via the network 100 and the internet 103. Then, the smartphone 102 executes login using login information held by the receipt scan application 620.

In step S3904, the expense settlement processing service server 106 determines whether the login is permitted, based on the login information received from the smartphone 102, and notifies the smartphone 102 the determination result. In a case where the application is started for the first time, or login to the expense settlement processing service server 106 using the login information held by the application has failed, the processing proceeds to step S3905. In a case where the login is successful, the processing proceeds to step S3909.

Figure 20A:
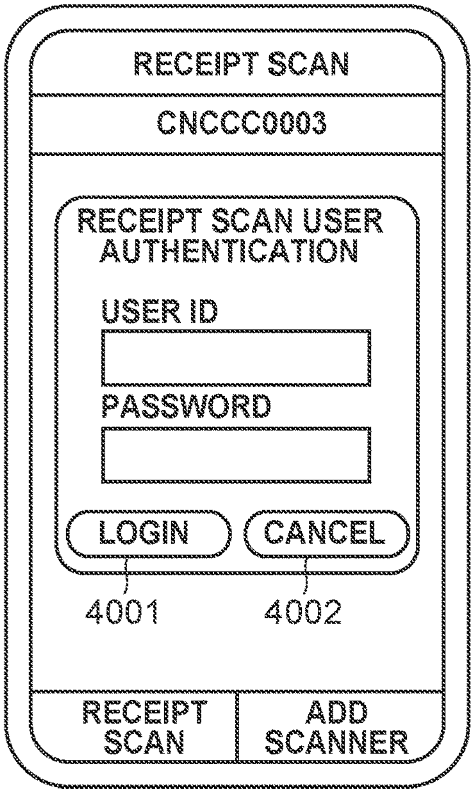
FIGS. 20A to 20D are diagrams each illustrating an operation screen related to the receipt scan application on the smartphone.

In step S3905, the smartphone 102 displays a login screen for the expense settlement processing service server 106 that is illustrated in FIG. 20A, on the operation unit 516, and asks the user to enter login information. In step S3906, the smartphone 102 receives the input of login information from the user. In step S3907, the smartphone 102 executes login to the expense settlement processing service server 106 similarly to step S3903. In step S3908, based on the input login information received from the smartphone 102, the expense settlement processing service server 106 performs a response indicating whether the login is permitted.

In a case where the login is permitted, the processing proceeds to step S3909. In a case where the login is not permitted, the processing returns to step S3905.

In step S3909, the smartphone 102 searches an image forming apparatus connection history acquired from the receipt scan application 620, for an image forming apparatus that is included in the connection history and is connected to the network 100 via the communication unit OF 523. The smartphone 102 executes the search for an image forming apparatus based on the connection history of the receipt scan application 620 using an mDNS name and an IP address. In a case where the smartphone 102 receives a response from an image forming apparatus (e.g., the image forming apparatus 101) during the search executed based on the connection history, the processing proceeds to step S3910. In a case where no response is received or in a case where the connection history does not exist, the processing proceeds to step S3911.

Figure 20B:
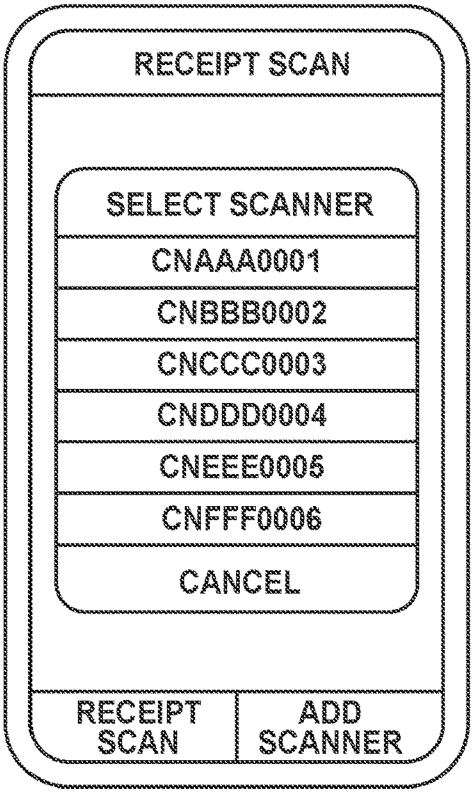

In step S3910, the image forming apparatus 101 included in the connection history of the MFP cooperation smartphone application transmits a response to a search request from the smartphone 102, and the processing proceeds to step S3914. In step S3911, the smartphone 102 searches for an image forming apparatus connected to the network 100 via the communication unit OF 523. In step S3912, the smartphone 102 displays a list of connectable image forming apparatuses that is illustrated in FIG. 20B, on the operation unit 516. In step S3913, the smartphone 102 detects an image forming apparatus (as an example, the image forming apparatus 101) selected by the user, based on the input via the operation unit 516, and the processing proceeds to step S3914. In step S3914, the smartphone 102 establishes connection with the image forming apparatus 101 using the mDNS name and the IP address.

In step S3915, in accordance with information regarding the receipt scan application 620, the smartphone 102 checks whether the receipt scan 424 is able to be loaded onto the RAM 213 of the image forming apparatus 101. In step S3916, the image forming apparatus 101 transmits a response indicating whether the receipt scan 424 is loadable onto and executable on the RAM 213. In a case where the RAM 213 has no enough space or a setting for an operation on the RAM 213 is disabled, the processing proceeds to step S3917. In a case where the receipt scan 424 is inoperable after being loaded on the RAM 213, the processing proceeds to step S3918.

Figure 20C:
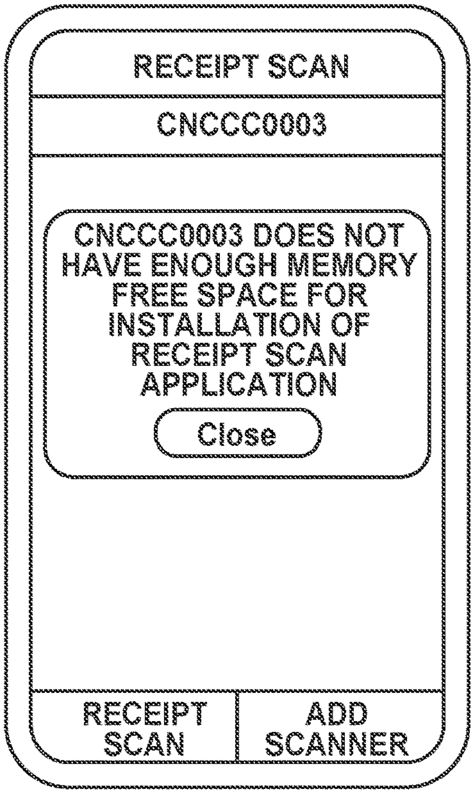

In a case where the smartphone 102 receives a response indicating that the RAM 213 has no enough space, or the receipt scan 424 is inoperable on the RAM 213, from the image forming apparatus 101, in step S3917, the smartphone 102 displays a RAM loading inexecutable screen of the receipt scan 424 that is illustrated in FIG. 20C, on the operation unit 516. In step S3918, the smartphone 102 downloads an installer of the receipt scan 424 contained in the receipt scan application 620, onto the image forming apparatus 101. In step S3919, the image forming apparatus 101 executes the downloaded installer of the receipt scan 424, and loads the application onto the RAM 213. In step S3920, the image forming apparatus 101 notifies the smartphone 102 of completion of the loading of the receipt scan 424.

In step S3921, the smartphone 102 issues an execution notification of the receipt scan application 620 to the image forming apparatus 101. In step S3922, the image forming apparatus 101 executes scan processing in accordance with an operation setting together with the execution notification. In step S3923, the image forming apparatus 101 transmits image data acquired by the scan processing to the smartphone 102. After completion of the transmission, the processing proceeds to step S3924. In step S3924, the image forming apparatus 101 deletes the receipt scan 424 from the RAM 213, and ends the processing.

Figure 20D:
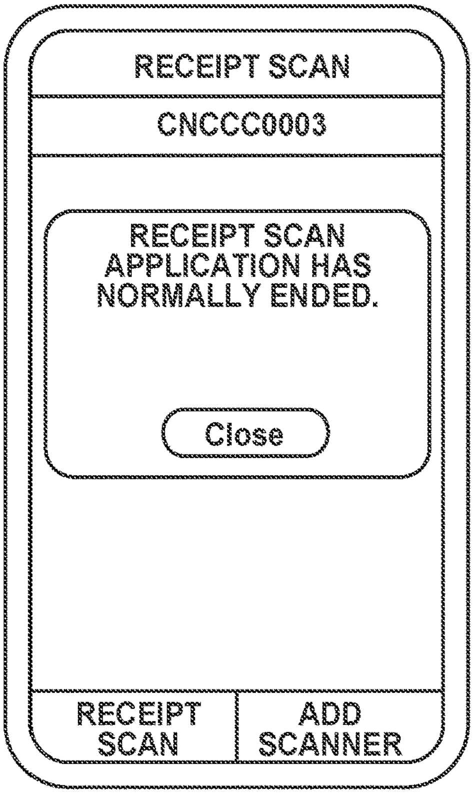

In step S3925, the smartphone 102 transfers scan data to the expense settlement processing service server 106 in accordance with the setting of the receipt scan application 620. In step S3926, the expense settlement processing service server 106 executes expense settlement processing including image processing and OCR processing on the received scan data to extract necessary character data and reflect the character data in expense settlement data. In step S3927, the expense settlement processing service server 106 notifies the smartphone 102 of completion of the expense settlement processing, and ends the processing. In a case where the receipt scan application 620 receives an expense settlement processing end notification from the expense settlement processing service server 106, the smartphone 102 displays an application end notification screen illustrated in FIG. 20D on the operation unit 516, and ends the processing.

Figure 21:
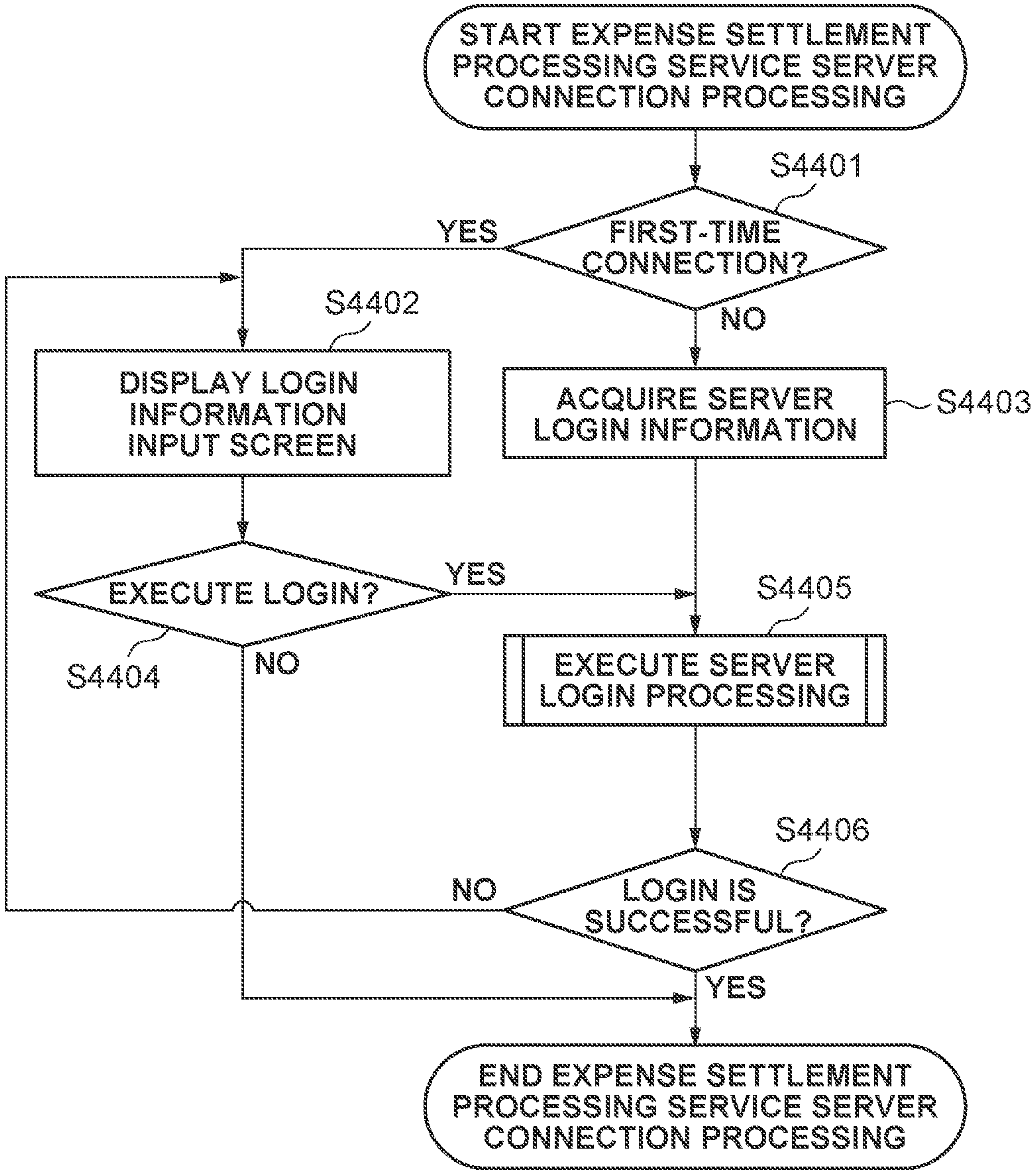
FIG. 21 is a diagram illustrating a procedure of connection to an expense settlement processing service server.

FIG. 21 illustrates details of processing in which the smartphone 102 connects to a server. In step S4401, the smartphone 102 checks whether connection to the server is established for the first time. In a case where connection to the server is established for the first time (YES in step S4401), the processing proceeds to step S4402. In step S4402, the smartphone 102 displays the login screen illustrated in FIG. 20A on the operation unit 516 to receive server login information, and the processing proceeds to step S4404. In a case where the connection to the server is not the first time (NO in step S4401), the processing proceeds to step S4403. In step S4403, the smartphone 102 acquires login information for the server from a connection history. In step S4404, the smartphone 102 determines whether a login button 4001 has been pressed after login information is input via the operation unit 516. In a case where the smartphone 102 detects the press of the login button 4001 (YES in step S4404), the processing proceeds to step S4405. In a case where the smartphone 102 detects the press of a cancel button 4002 (NO in step S4404), the smartphone 102 ends the processing.

In step S4405, the smartphone 102 notifies the expense settlement processing service server 106 of the acquired login information. The expense settlement processing service server 106 executes login to the server using the login information. In step S4406, the smartphone 102 checks a result of server login processing from the expense settlement processing service server 106 and determines whether the login is successful. In a case where the login is successful (YES in step S4406), the smartphone 102 ends the processing. In a case where the login is not successful (NO in step S4406), the processing returns to step S4402.

Figure 22:
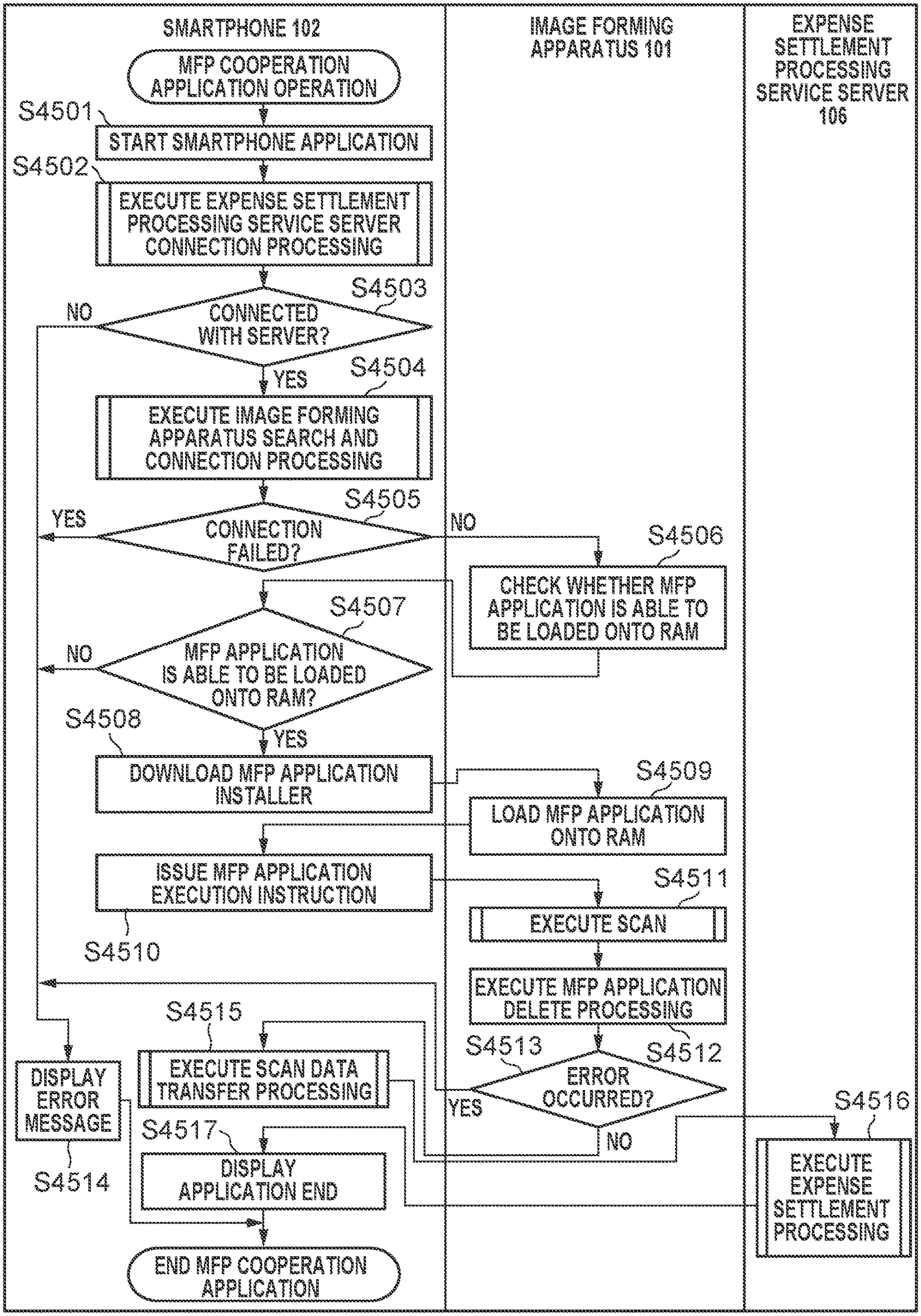
FIG. 22 is a diagram illustrating a detailed procedure of processing of loading the receipt scan application onto the RAM of the image forming apparatus.

FIG. 22 illustrates a detailed procedure of the processing illustrated in FIG. 19. When the smartphone 102 detects that the receipt scan application icon 705 is touched, based on a pressed position on the operation unit 516, in step S4501, the smartphone 102 starts the receipt scan application 620. In step S4502, the smartphone 102 performs the server connection processing described with reference to FIG. 21. In the case of the receipt scan application 620, the smartphone 102 establishes connection to the expense settlement processing service server 106. In step S4503, the smartphone 102 checks whether the server connection processing has been normally established. In a case where connection with the server has been normally established (YES in step S4503), the processing proceeds to step S4504. In a case where an error has occurred (NO in step S4503), the processing proceeds to step S4514. In step S4504, the smartphone 102 performs search and connection processing of the image forming apparatus 101, which has been described with reference to FIG. 10. In step S4505, the smartphone 102 checks a result of the image forming apparatus search and connection processing, and determines whether the connection has failed. In a case where the connection is successful (NO in step S4505), the processing proceeds to step S4506. In a case where the connection has failed (YES in step S4505), the processing proceeds to step S4514.

In step S4506, the image forming apparatus 101 performs a response indicating whether the receipt scan 424 is able to be loaded onto a RAM included in a notification from the smartphone 102. The image forming apparatus 101 determines whether the receipt scan 424 is able to be installed, by checking whether the operation on the RAM 213 is permitted, and whether the RAM 213 has an enough free space for loading of the receipt scan 424 together with an installer.

In step S4507, the smartphone 102 determines whether the receipt scan 424 is able to be loaded onto the RAM 213, based on the response from the image forming apparatus 101. In a case where the receipt scan 424 is able to be loaded onto the RAM 213 (YES in step S4507), the processing proceeds to step S4508. In a case where the receipt scan 424 is not able to be loaded onto the RAM 213 (NO in step S4507), the processing proceeds to step S4514.

In step S4508, the smartphone 102 downloads an installer of the receipt scan 424 contained in the receipt scan application 620 onto the image forming apparatus 101.

In step S4509, the image forming apparatus 101 stores the installer of the receipt scan 424 into the RAM 213. The installer of the receipt scan 424 loads the application on the RAM 213 and enables the application to be used. After the smartphone 102 receives a notification indicating completion of the loading of the receipt scan 424 from the image forming apparatus 101, in step S4510, the smartphone 102 issues an execution instruction of the receipt scan 424 to the image forming apparatus 101. In step S4511, the image forming apparatus 101 performs a scan operation in accordance with a setting held by the receipt scan 424, and transfers scan data to the smartphone 102. After completion of the scan operation, in step S4512, the image forming apparatus 101 performs deletion processing of the receipt scan 424 loaded on the RAM 213.

In step S4513, the image forming apparatus 101 checks whether an error has occurred in the scan operation. In a case where an error has occurred (YES in step S4513), the processing proceeds to step S4514. In a case where the scan operation has been normally executed (NO in step S4513), the processing proceeds to step S4515. In step S4515, the smartphone 102 transfers scan data transferred from the image forming apparatus 101 to the expense settlement processing service server 106.

Figure 23A:
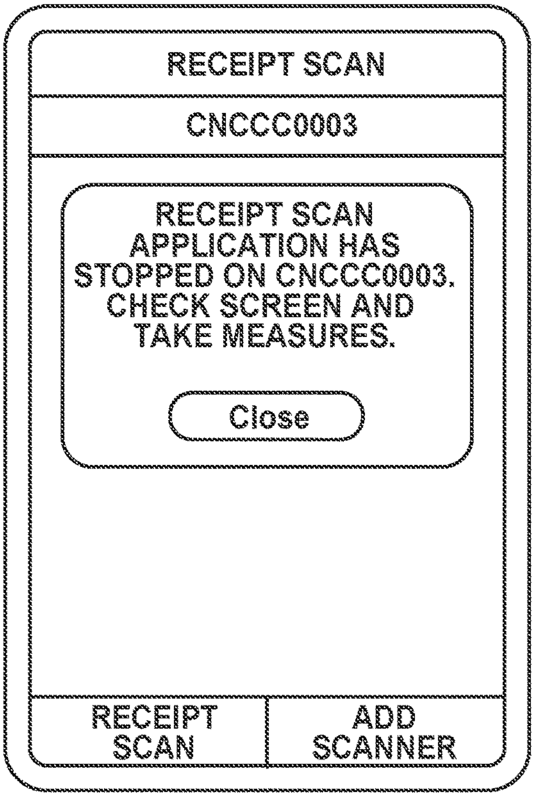
FIGS. 23A and 23B are diagrams each illustrating an operation screen related to the receipt scan application on the smartphone.

In step S4514, the smartphone 102 displays a screen illustrated in FIG. 23A, in accordance with error information transmitted from the image forming apparatus 101, on the operation unit 516, and ends the processing. In step S4516, the expense settlement processing service server 106 performs OCR processing and character extraction processing on the scan data transferred from the smartphone 102 to acquire necessary information, performs expense settlement processing, and completes the processing. After the smartphone 102 receives a notification indicating that the expense settlement processing has been completed, from the expense settlement processing service server 106, in step S4517, the smartphone 102 displays the end screen illustrated in FIG. 20D, on the operation unit 516, and ends the receipt scan application 620.

Figure 24:
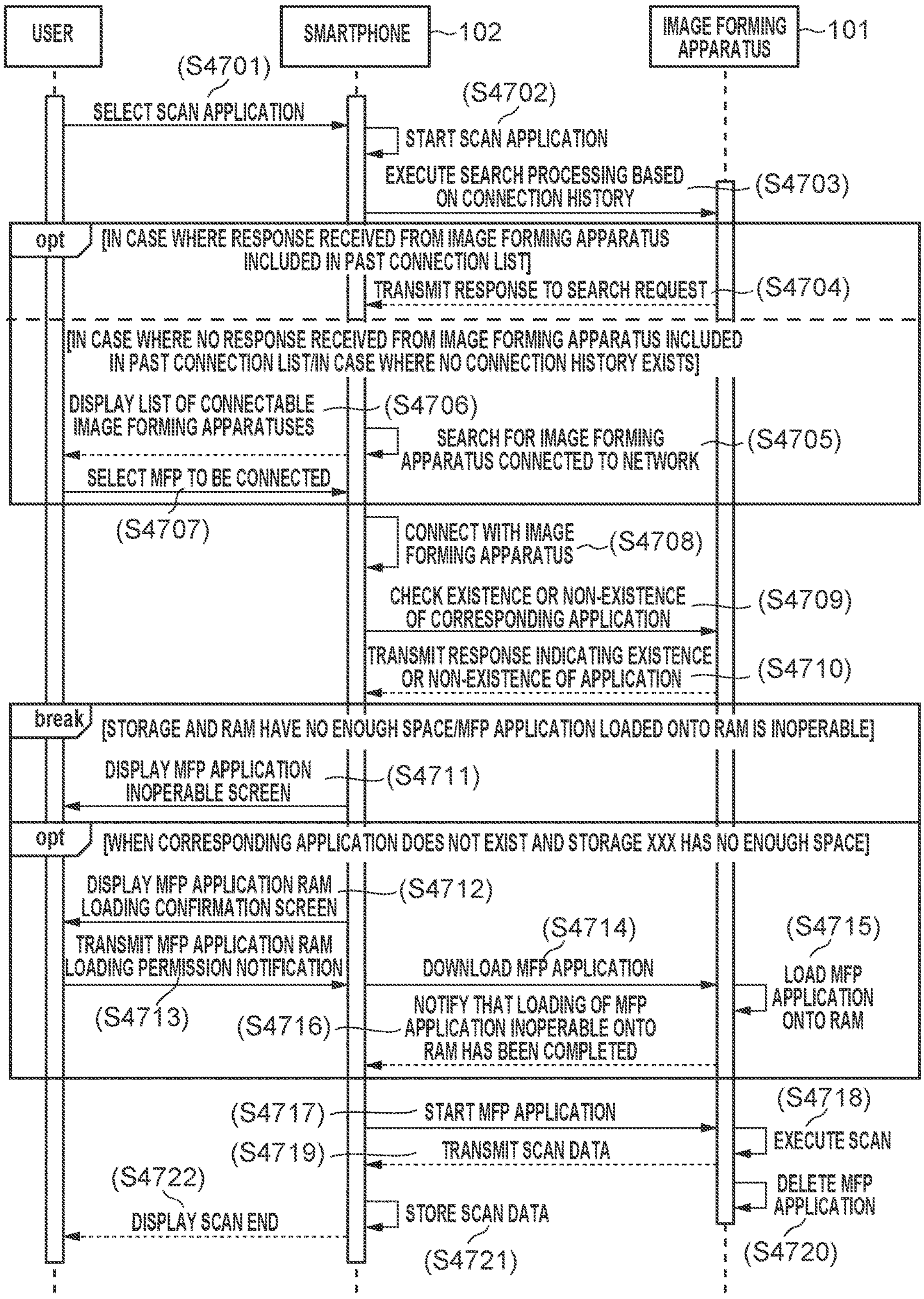
FIG. 24 is a diagram illustrating an operation sequence of RAM loading that is performed in a case where a storage of the smartphone scan application has no enough space.

FIG. 24 illustrates an operation sequence of processing that is performed in a case where an image forming apparatus cooperation application installed on the smartphone 102 is started, a smartphone cooperation MFP application is not able to be installed on the image forming apparatus 101, and the application is loaded on the RAM 213 to implement a function of the application. The description will be given using the smartphone scan application 621 as an example of the application.

The processing in steps S4701 to S4709 is similar to the processing in steps S1501 to S1509 of FIG. 8. In step S4710, the image forming apparatus 101 checks the existence or non-existence of a corresponding application, and checks whether the storage 214 has an enough free space to install the application. In a case where the application is able to be installed onto the storage 214, the processing in step S1509 and subsequent steps of FIG. 8 is executed. In a case where a corresponding application exists, the processing in step S1516 and subsequent steps is executed. In a case where the storage 214 has no enough free space, the application is inoperable on the RAM 213 after being loaded on the RAM 213, or the RAM 213 has no enough free space, the processing proceeds to step S4711. In a case where the application is operable on the RAM 213 after being loaded on the RAM 213 and the RAM 213 has an enough free space for loading the application, the processing proceeds to step S4711.

Figure 12C:
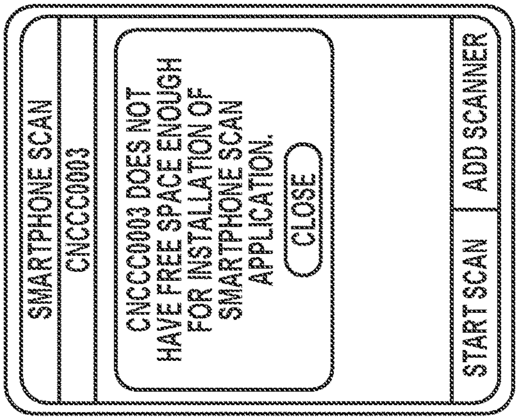
Figure 12D:
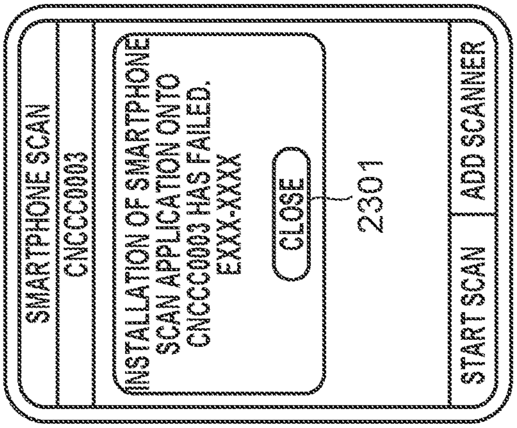
Figure 12E:
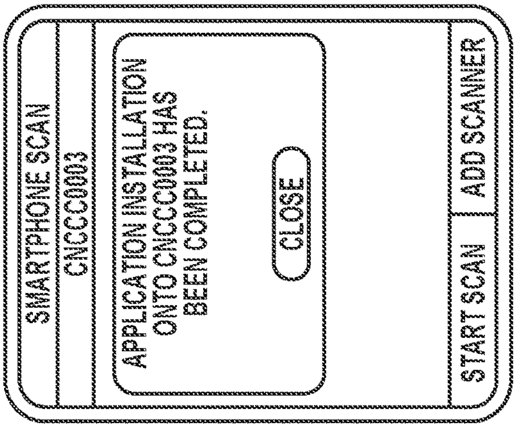
Figure 23B:
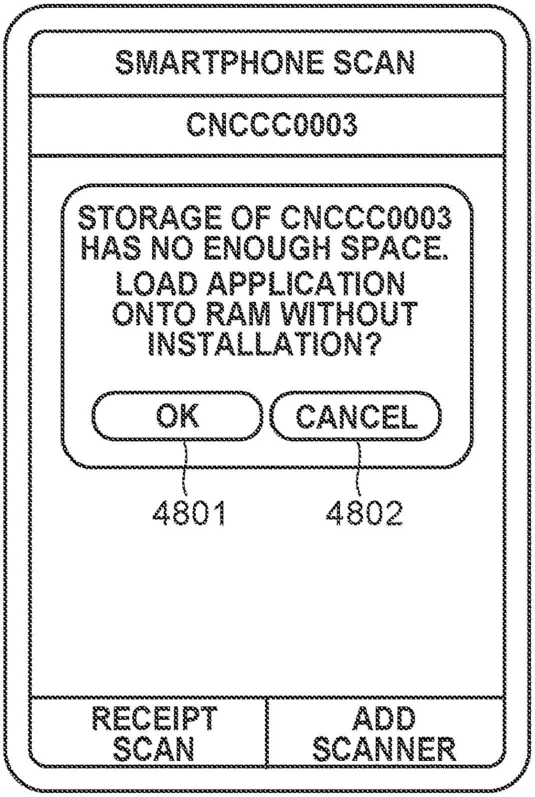

In step S4711, in a case where the storage 214 or the RAM 213 of the image forming apparatus 101 has no enough free space, the smartphone 102 displays the screen illustrated in FIG. 12C, on the operation unit 516, and in a case where the application is inoperable on the RAM 213 after being loaded on the RAM 213, the smartphone 102 displays the screen illustrated in FIG. 12D, on the operation unit 516, and ends the processing. In step S4712, the smartphone 102 displays a screen illustrated in FIG. 23B on the operation unit 516. The screen is displayed to confirm whether the application is to be executed without installation of the application, to load the smartphone scan 423 onto the RAM 213 of the image forming apparatus 101. In step S4713, the smartphone 102 detects a pressing operation performed on an OK button 4801 via the operation unit 516, and the processing proceeds to step S4714. In a case where the smartphone 102 detects a pressing operation performed on a cancel button 4802, the smartphone 102 ends the processing.

In step S4714, the smartphone 102 downloads the smartphone scan 423 contained in the smartphone scan application 621 onto the image forming apparatus 101. In step S4715, the image forming apparatus 101 loads the received installer of the smartphone scan 423 onto the RAM 213. In step S4716, the image forming apparatus 101 notifies the smartphone 102 of completion of the loading. In step S4717, the smartphone 102 issues a start instruction of the smartphone scan 423 to the image forming apparatus 101. In step S4718, the image forming apparatus 101 executes a scan operation. In step S4719, the image forming apparatus 101 transmits image data obtained by the scan operation to the smartphone 102. In step S4720, the image forming apparatus 101 deletes the smartphone scan 423 loaded on the RAM 213. In step S4721, the smartphone 102 stores the received scan data into a determined area in the storage 514. In step S4722, the smartphone 102 displays the screen illustrated in FIG. 15B indicating that the operation of the smartphone scan application has been completed, on the operation unit 516, and ends the processing.

Through the above-described sequence in steps S4701 to S4721, a smartphone scan application is started. The sequence becomes a sequence of connecting to the image forming apparatus 101, downloading the smartphone scan application, executing the installation, and executing scan in cooperation with the installed smartphone scan application.

As described above, the image forming apparatus 101 connects with an MFP cooperation smartphone application installed on the smartphone 102 connected via the communication unit OF 223 and the network 100. Then, in a case where the MFP cooperation smartphone application is set to load a smartphone cooperation MFP application onto the RAM 213 of the image forming apparatus 101, or the image forming apparatus 101 is set to load the smartphone cooperation MFP application onto the RAM 213, the MFP cooperation smartphone application is loaded onto and operates on the RAM 213. Downloading the smartphone cooperation MFP application on the RAM 213 and causing the smartphone cooperation MFP application to operate on the RAM 213 allows the image forming apparatus 101 to execute an application for an image forming apparatus without installing the application onto a storage of the image forming apparatus 101.

In a case where the image forming apparatus 101 detects that a storage of the image forming apparatus 101 has no enough free space, during the communication in step S4709 that is executed to check the existence or non-existence of a corresponding application, the image forming apparatus 101 determines that a smartphone cooperation MFP application is not able to be installed. However, in a case where the smartphone cooperation MFP application is operable after being loaded on the RAM 213, and in a case where the RAM 213 has an enough free space for loading the smartphone cooperation MFP application, the smartphone cooperation MFP application is able to be loaded onto and executed on the RAM 213.

In the present embodiment, the description has been given of a configuration in which a scan image obtained with the reading unit 218 of the image forming apparatus 101 is transmitted to an MFP cooperation smartphone application on the smartphone 102. Aside from this, an operation of the printing unit 220 of the image forming apparatus 101 that is to be performed in response to a print instruction issued from the MFP cooperation smartphone application, and an operation result of the printing unit 220 can be displayed on the operation unit 516 of the smartphone 102 in response to a notification to the smartphone 102. In the present embodiment, the description has been given using an application of the image forming apparatus 101 and an installer, but the present embodiment can also be applied to information processing apparatuses that are connectable with the smartphone 102.

In the first embodiment, the image forming apparatus 101 installs a smartphone cooperation MFP application onto the storage 214, and then obtains a necessary function by causing an MFP cooperation smartphone application and the smartphone cooperation MFP application to cooperate with each other from the smartphone 102. In a third embodiment, a smartphone cooperation MFP application is able to independently access a server by acquiring a necessary setting from information regarding the smartphone 102 when the smartphone cooperation MFP application is installed from the smartphone 102 onto the image forming apparatus 101.

Figure 25A:
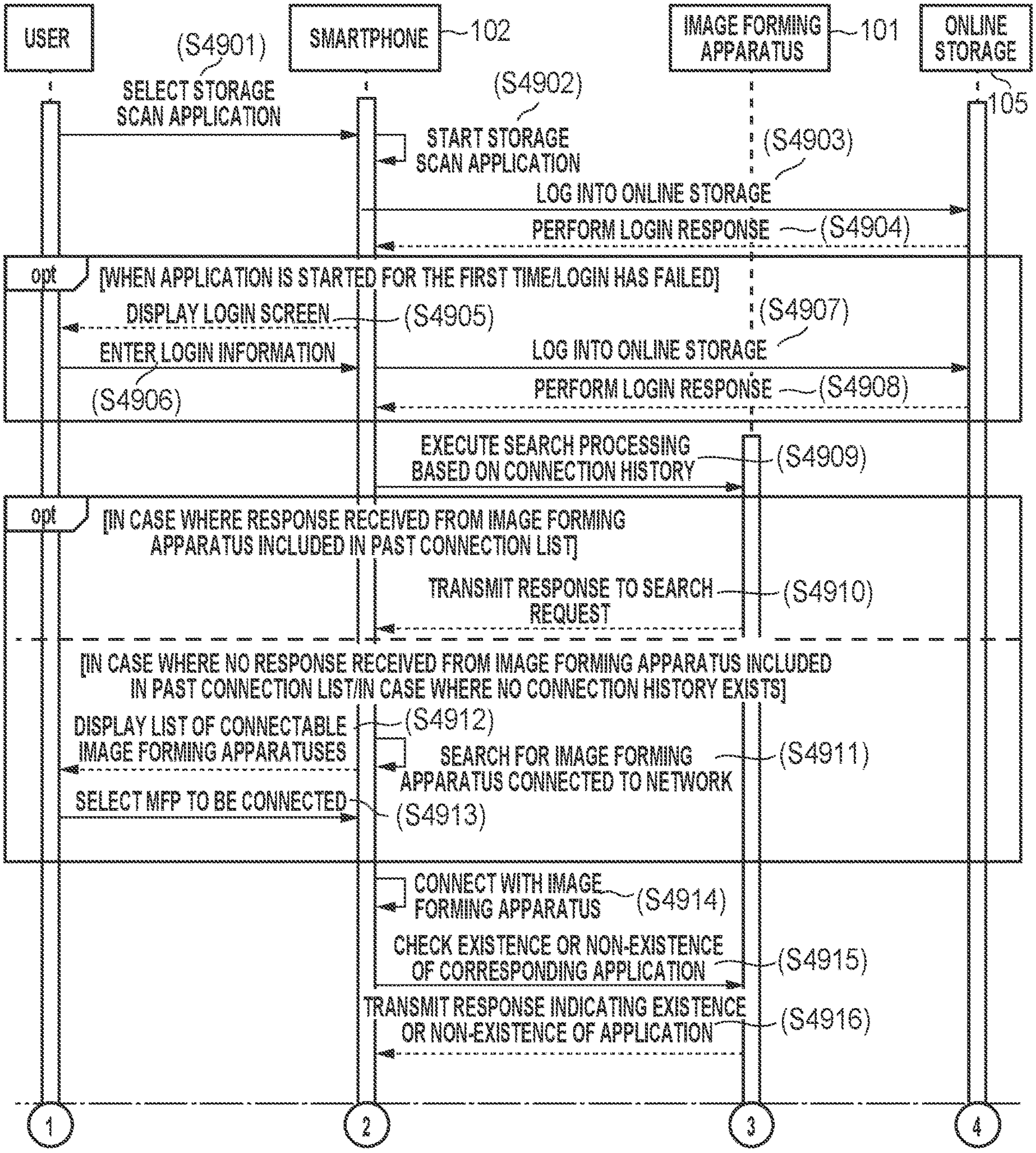
FIGS. 25A and 25B are diagrams illustrating a sequence of processing that is performed in a case where only an application is installed and reset from the smartphone.
Figure 25B:
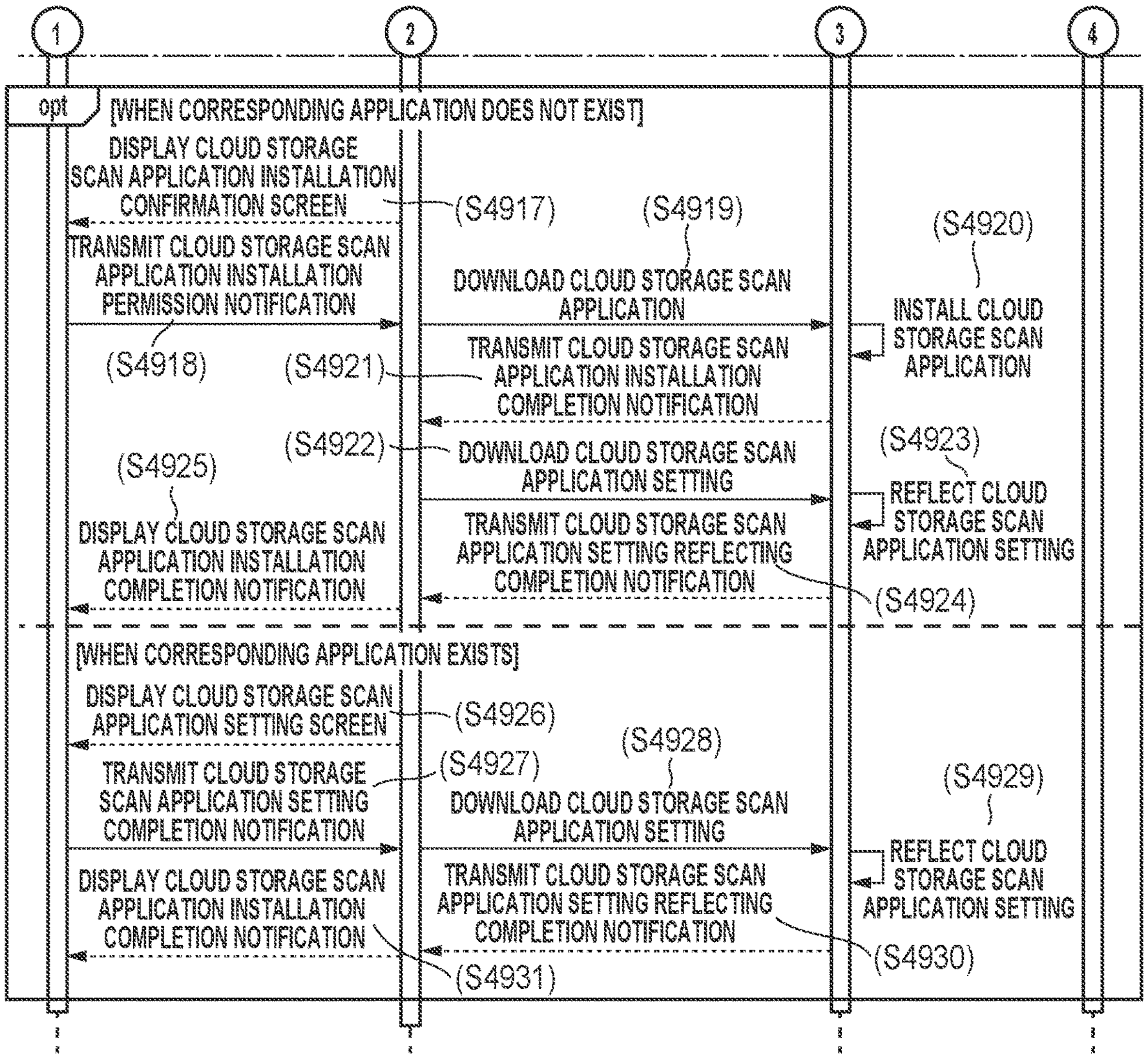

FIGS. 25A and 25B are diagrams illustrating a sequence of processing that is performed in a case where a smartphone cooperation MFP application is installed onto the storage 214 of the image forming apparatus 101, and information set on an MFP cooperation smartphone application is reflected. The smartphone cooperation MFP application in FIGS. 25A and 25B is set to operate without a smartphone after the smartphone cooperation MFP application is installed onto the image forming apparatus 101. The cloud storage scan application 623 and the cloud storage scan 426 are used as examples of an application to be described with reference to FIGS. 25A and 25B.

The processing in steps S4901 to S4908 is similar to the processing in steps S3901 to S3908 of FIG. 19 except that the receipt scan 424 is replaced with the cloud storage scan 426. The processing in steps S4909 to S4916 is similar to the processing in steps S903 to S909 of FIG. 6. In a case where a response indicating that the cloud storage scan 426 is not installed is received as an application existence or non-existence response from the image forming apparatus 101 that is performed in step S4916, the processing proceeds to step S4917. In a case where the cloud storage scan 426 is installed, the processing proceeds to step S4925. In step S4917, the smartphone 102 displays a cloud storage scan installation confirmation screen illustrated in FIG. 26A, on the operation unit 516.

Figure 26A:
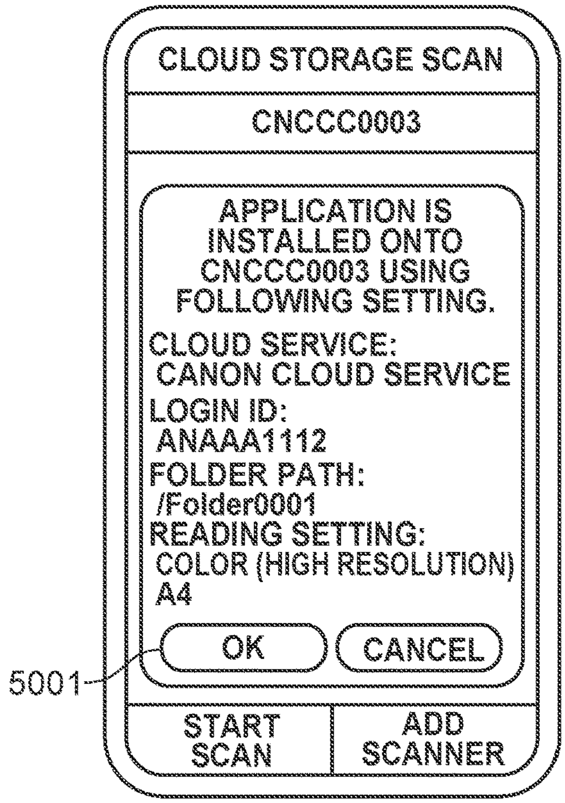
FIGS. 26A to 26D are diagrams each illustrating an operation screen related to a cloud storage scan application on the smartphone.

On the installation confirmation screen illustrated in FIG. 26A, a cloud service to which the smartphone 102 is to be connected, a login ID, a default setting folder path, and a default setting reading setting are displayed. In step S4918, in a case where the smartphone 102 detects that an OK button 5001 is pressed via the operation unit 516, the processing proceeds to step S4919. In step S4919, the smartphone 102 downloads the cloud storage scan 426 contained in the cloud storage scan application 623 onto the image forming apparatus 101.

Figure 27A:
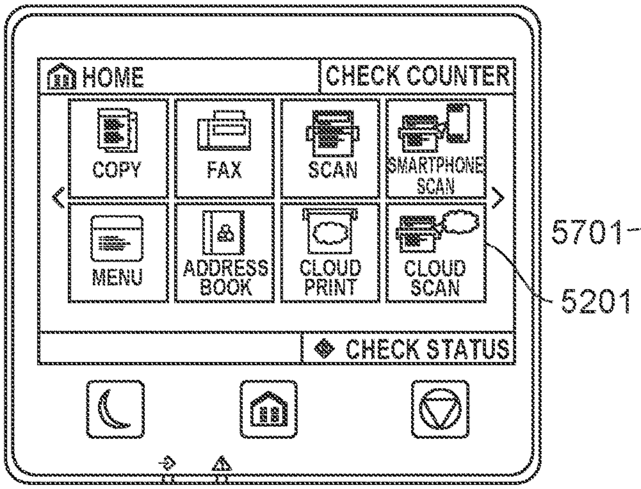
FIGS. 27A to 27D are diagrams each illustrating an operation screen related to a cloud storage scan application on the image forming apparatus.

In step S4920, the image forming apparatus 101 installs the received cloud storage scan 426, and adds a cloud storage scan icon 5201 illustrated in FIG. 27A to the home screen. Then, in step S4921, the image forming apparatus 101 notifies the smartphone 102 of completion of the installation. In step S4922, the smartphone 102 downloads application setting data set in the cloud storage scan application 623 onto the image forming apparatus 101. The downloaded data is application setting data illustrated in FIG. 26A.

Figure 26B:
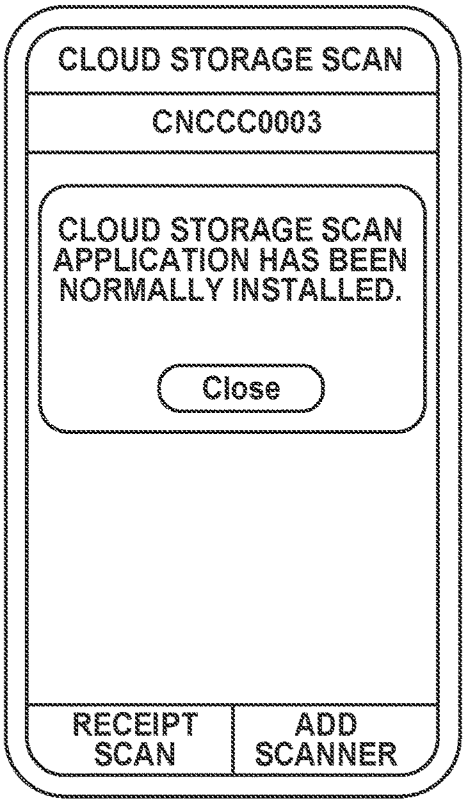

In step S4923, the image forming apparatus 101 reflects the received application setting data in the cloud storage scan 426. In step S4924, the image forming apparatus 101 transmits a response to the smartphone 102. In step S4925, the smartphone 102 displays an installation completion screen illustrated in FIG. 26B on the operation unit 516, and ends the processing. In step S4926, the smartphone 102 displays a cloud storage scan resetting screen illustrated in FIG. 26C on the operation unit 516.

Figure 26C:
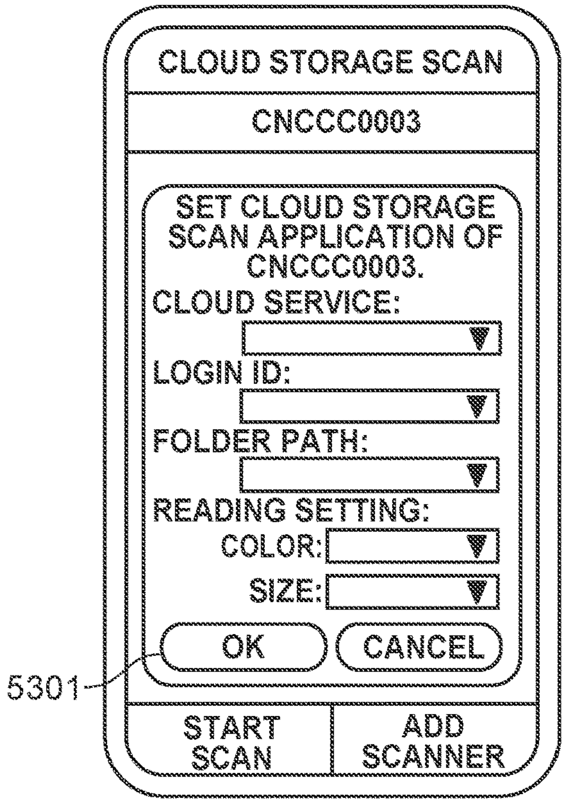

On the cloud storage scan resetting screen illustrated in FIG. 26C, a setting is changeable by checking checkboxes of items including a cloud service to which the smartphone 102 is to be connected, a login ID, a default setting folder path, and a reading setting, and pressing an OK button 5301. In step S4927, in a case where the smartphone 102 detects a pressing operation performed on the OK button 5001 via the operation unit 516, the processing proceeds to step S4928. The processing in steps S4928 to S4930 is similar to the processing in steps S4922 to S4924.

Figure 26D:
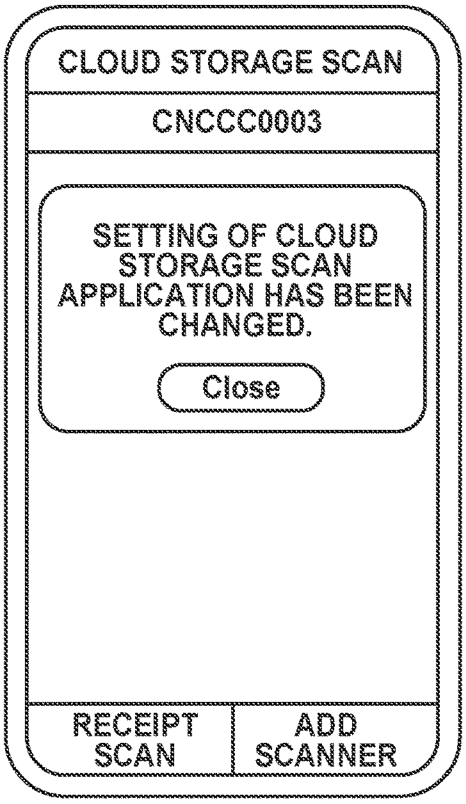

In step S4925, the smartphone 102 displays an install completion screen illustrated in FIG. 26D, on the operation unit 516, and ends the processing.

Figure 28:
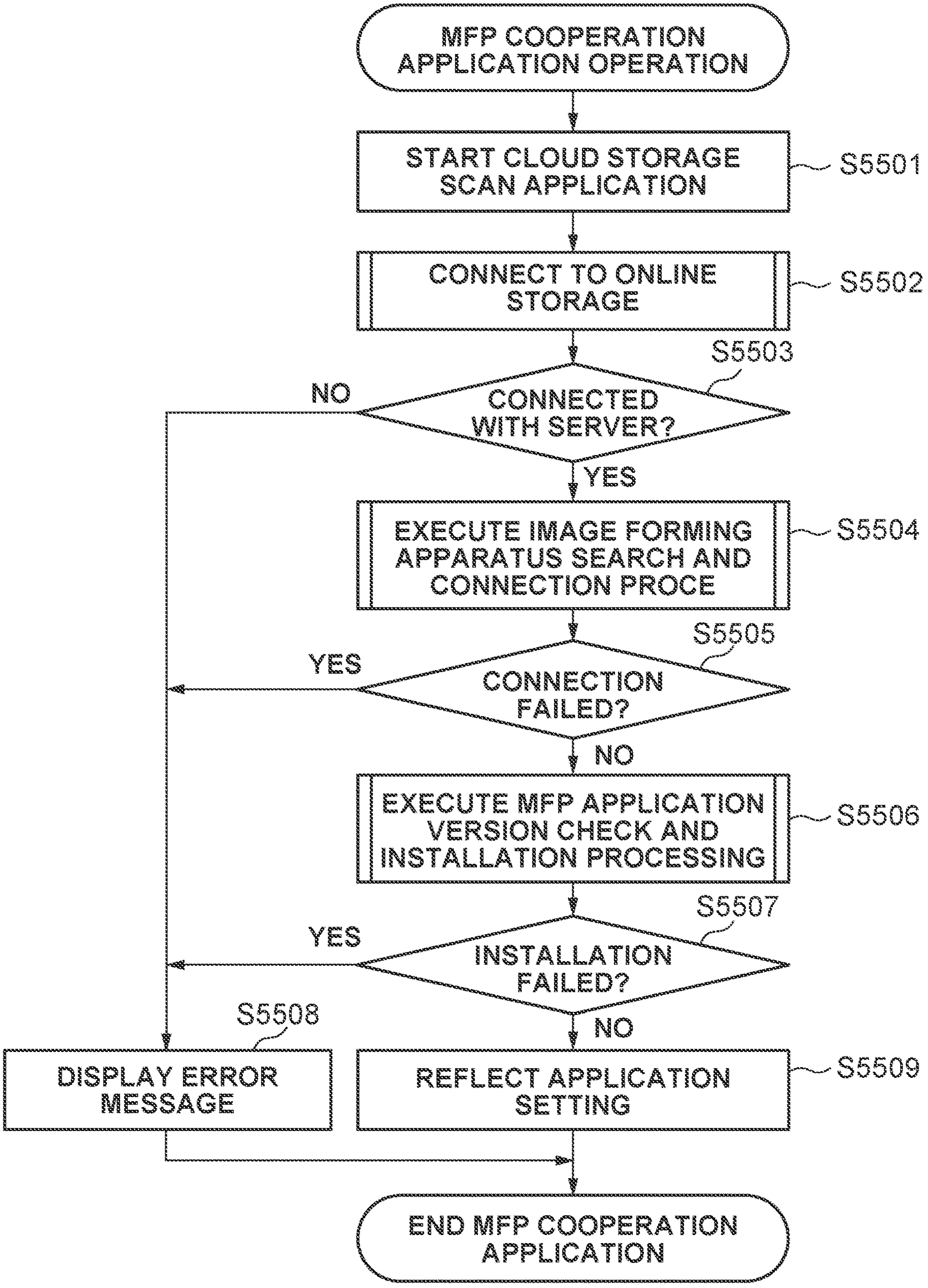
FIG. 28 is a diagram illustrating a detailed procedure of processing to be performed in a case where only an application is installed and reset from the smartphone.

FIG. 28 illustrates a detailed procedure of the processing illustrated in FIGS. 25A and 25B. The processing in steps S5501 to S5503 is the same as the processing in steps S4501 to S4503 of FIG. 22. The cloud storage scan application 623 and the cloud storage scan 426 are started up in response to a pressing operation performed on the cloud storage scan icon 5201. The processing in steps S5504 and S5505 is the same as the processing in steps S2502 and S2503 of FIG. 13. The version check and installation processing of the cloud storage scan 426 in step S5506 is the same as the processing in step S2504. In a case where the cloud storage scan 426 is installed on the image forming apparatus 101, it is determined that the application exits, and the processing is ended.

In step S5507, the smartphone 102 checks whether the installation has failed. In a case where the installation has failed (YES in step S5507), the processing proceeds to step S5508. In step S5508, the smartphone 102 displays an error message on the operation unit 516, and ends the processing. In a case where the installation has not failed (NO in step S5507), and when the application exists, the processing proceeds to step S5509. In step S5509, application setting data downloaded from the smartphone 102 is reflected, and ends the processing.

Figure 29:
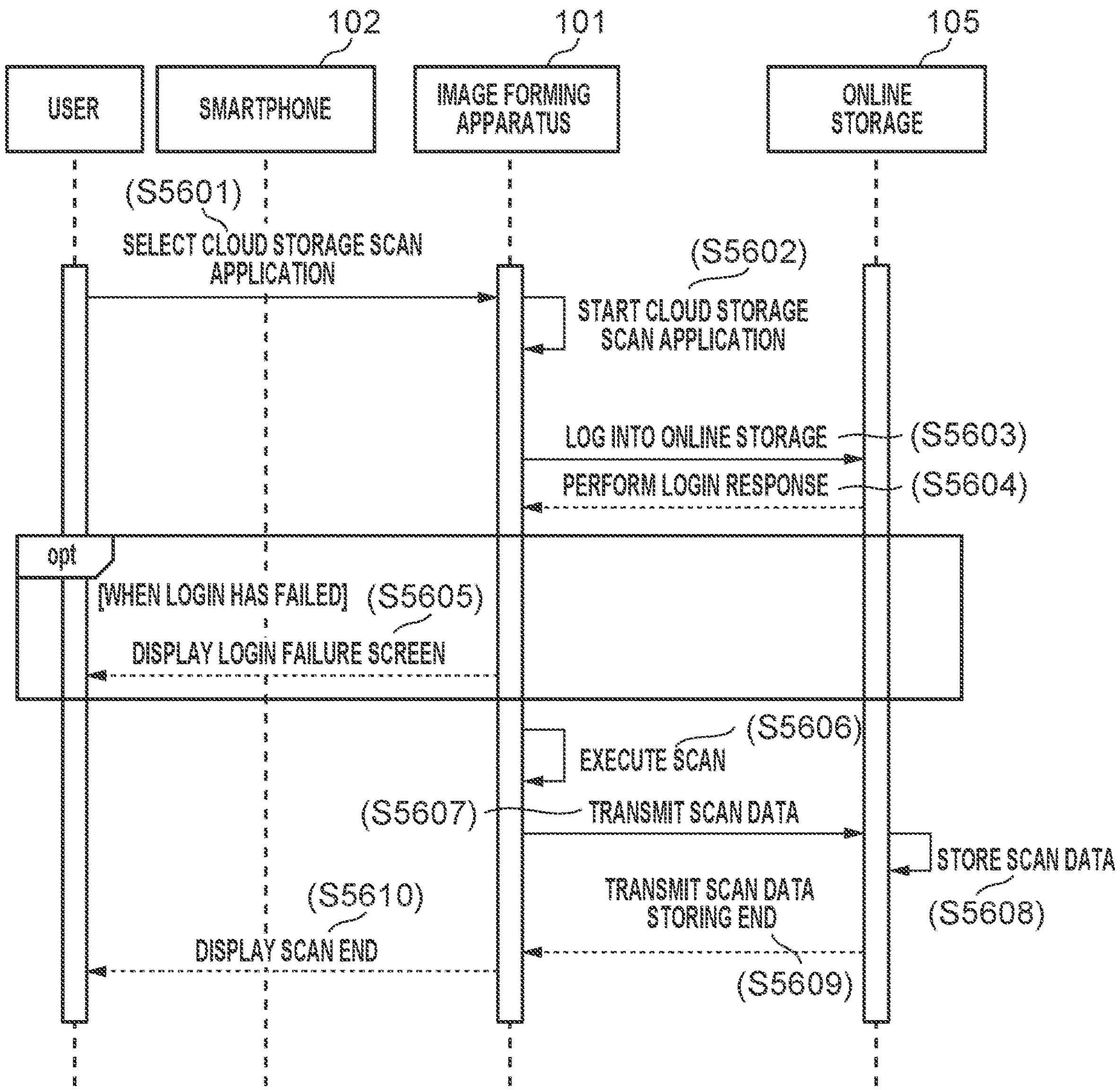
FIG. 29 is a diagram illustrating a sequence of processing that is performed in a case where an operation is performed only by an application installed on the image forming apparatus.

FIG. 29 is a diagram illustrating a sequence of processing that is performed in a case where a smartphone cooperation MFP application installed on the storage 214 of the image forming apparatus 101 is started and operated without connection with a smartphone. Similarly to FIGS. 25A and 25B, the cloud storage scan 426 is used as an example of an application to be described with reference to FIG. 29.

In step S5601, the image forming apparatus 101 detects a pressing operation performed to select the cloud storage scan 426 displayed on the operation unit 216, and the processing proceeds to step S5602. In step S5602, the image forming apparatus 101 starts the cloud storage scan 426.

Figure 27B:
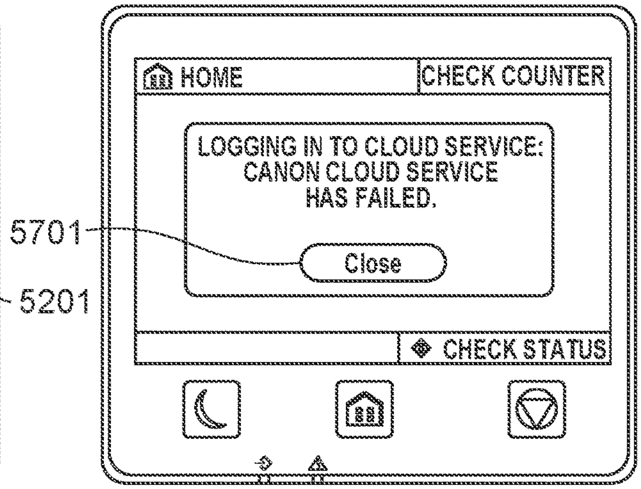

In step S5603, the image forming apparatus 101 executes login to the online storage 105 using login information set in an application, via the communication unit OF 523 and the network 100. In step S5604, the online storage 105 executes login by checking the login information received from the image forming apparatus 101, and transmits a response indicating a result to the image forming apparatus 101. The image forming apparatus 101 checks the login response received from the online storage 105. In a case where the login has failed, the processing proceeds to step S5605. In step S5605, the image forming apparatus 101 displays a login failure screen illustrated in FIG. 27B on the operation unit 516.

Figure 27C:
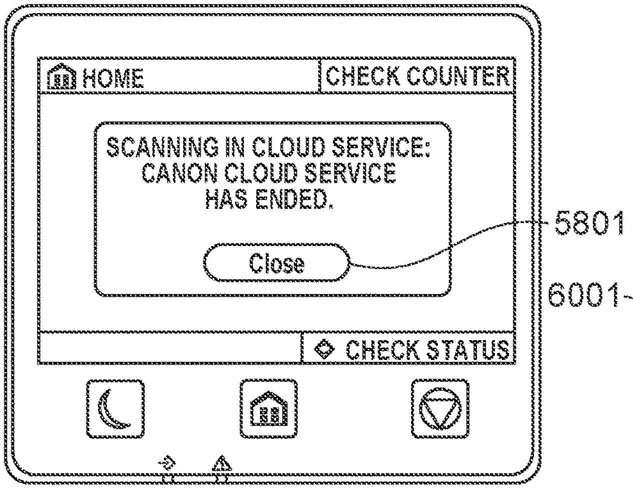

In a case where the login has not failed, the processing proceeds to step S5606. In step S5606, the image forming apparatus 101 executes scan in accordance with information set in the application. In step S5607, the image forming apparatus 101 transmits scan data to the online storage 105. In step S5608, the online storage 105 stores an image in accordance with setting information transmitted together with the scan data. After completion of the storing, the processing proceeds to step S5609. In step S5609, the online storage 105 notifies the image forming apparatus 101 of a processing end. In step S5610, the image forming apparatus 101 displays an end screen of the cloud storage scan 426 that is illustrated in FIG. 27C, on the operation unit 216, and ends the processing.

Figure 30:
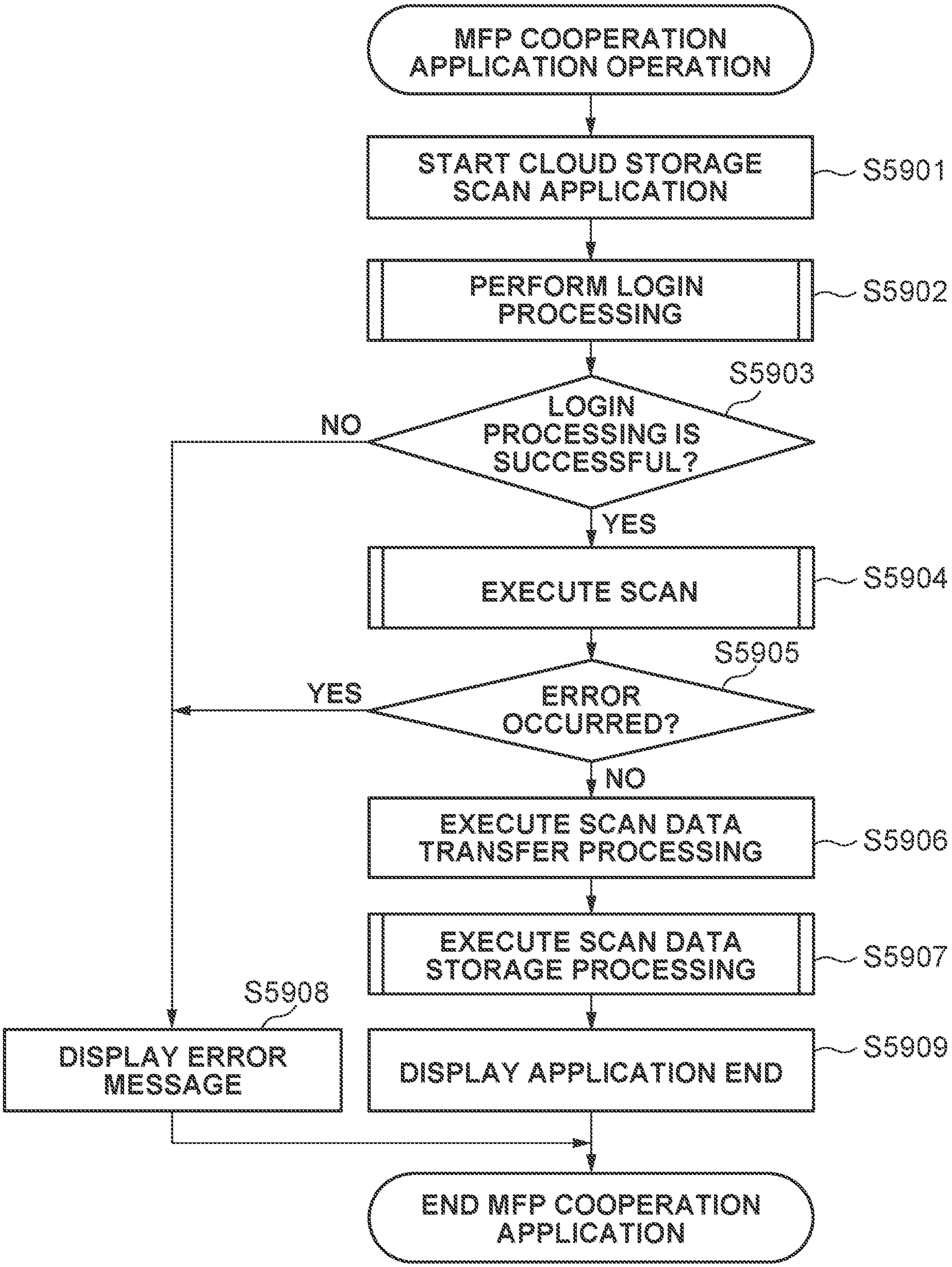
FIG. 30 is a diagram illustrating a detailed procedure of processing to be performed in a case where an operation is performed only by an application installed on the image forming apparatus.

FIG. 30 illustrates a detailed procedure of the processing illustrated in FIG. 29. In step S5901, the image forming apparatus 101 starts the cloud storage scan 426, and acquires information regarding the online storage 105 to which the image forming apparatus 101 is to be connected, and a scan setting from application setting data. In step S5902, the online storage 105 performs login processing in accordance with login information received from the image forming apparatus 101. In step S5903, the image forming apparatus 101 checks a result of the login processing received from the online storage 105 to determine whether the login processing is successful. In a case where the login processing is not successful and connection with the online storage 105 is not established (NO in step S5903), the processing proceeds to step S5908. In a case where the login processing is successful (YES in step S5903), the processing proceeds to step S5904. In step S5904, the image forming apparatus 101 executes scan in accordance with application setting data held by the cloud storage scan 426.

Figure 27D:
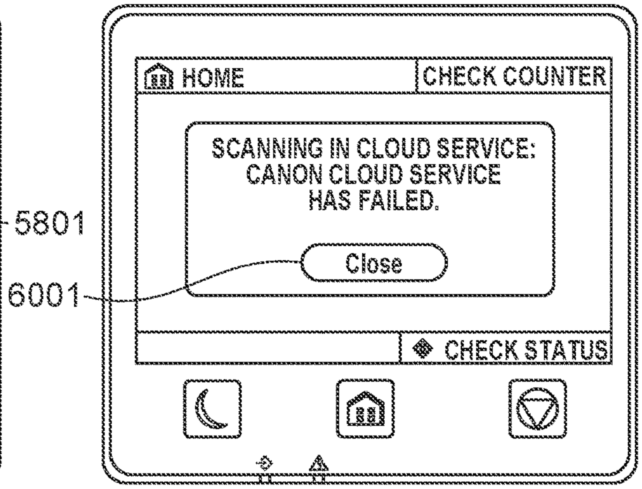

In step S5905, the image forming apparatus 101 checks whether an error has occurred. In a case where an error has occurred (YES in step S5905), the processing proceeds to step S5908. In a case where the scan has been normally executed (NO in step S5905), the processing proceeds to step S5906. In step S5906, the image forming apparatus 101 transfers scan data to the online storage 105. In step S5907, the online storage 105 stores the scan data transmitted from the image forming apparatus 101, in accordance with setting data transmitted at the same time. After the image forming apparatus 101 receives a notification of data storing completion from the online storage 105, in step S5909, the image forming apparatus 101 displays a message illustrated in FIG. 27C that indicates an application end, on the operation unit 216, and ends the processing. In step S5908, the image forming apparatus 101 displays an error screen illustrated in FIG. 27D on the operation unit 216 in accordance with an error message from the cloud storage scan 426, and completes the processing.

As described above, the image forming apparatus 101 connects with an MFP cooperation smartphone application installed on the smartphone 102 connected via the communication unit OF 223 and the network 100. Then, in a case where the MFP cooperation smartphone application is set to individually operate with a smartphone cooperation MFP application being installed on the storage 214 of the image forming apparatus 101, the MFP smartphone cooperation application is individually started and operated. Since a smartphone cooperation MFP application is individually operated, the image forming apparatus 101 is able to download and install an application from the smartphone 102 to use the necessary application for an image forming apparatus.

In the present embodiment, the description has been given of a configuration in which a scan image obtained with the reading unit 218 of the image forming apparatus 101 is transmitted to the online storage 105. Aside from this, an MFP cooperation smartphone application can check an operation of the printing unit 220 of the image forming apparatus 101 that is to be performed in response to an instruction to print an image stored in the online storage 105, and an operation result of the printing unit 220. Furthermore, the MFP cooperation smartphone application can display a result on the operation unit 216 of the smartphone 102 by the notification. While, in the present embodiment, the description has been given using an application of the image forming apparatus 101 and an installer, the present embodiment can also be applied to information processing apparatuses that are able to connect with the smartphone 102.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc™ (BD)), a flash memory device, a memory card, and the like.

While the present disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of priority from Japanese Patent Application No. 2022-172867, filed Oct. 28, 2022, which is hereby incorporated by reference herein in its entirety.

What is claimed is:

1. A control method for an information processing apparatus configured to communicate with an image forming apparatus via a network, the image forming apparatus including a reading unit configured to scan a sheet for reading and a printing unit configured to print data on a sheet, the method comprising:

executing a first program having a cooperation function of causing the image forming apparatus and the information processing apparatus to cooperate with each other, the first program storing, inside the information processing apparatus, a second program for the image forming apparatus, the second program being an executable installer package having an installation function to cause a corresponding application to be executable on the image forming apparatus;

when the cooperation function is activated by a user operation or an application start-up, (a) determining whether a version of the corresponding application installed on the image forming apparatus satisfies a predetermined condition, and (b) extracting, in a case where it is determined that the version does not satisfy the predetermined condition, the second program from inside the first program and transmitting the extracted second program from the information processing apparatus to the image forming apparatus to update the corresponding application on the image forming apparatus by executing the executable installer package on the image forming apparatus; and instructing, after completion of the update of the corresponding application, from the information processing apparatus, the image forming apparatus to execute an image forming processing operation by causing the reading unit to read a document or the printing unit to print data by transmitting an execution instruction addressed to the updated corresponding application to cause the updated corresponding application to control the reading unit or the printing unit.

2. The control method for the information processing apparatus according to claim 1, further comprising detecting a state of the image forming apparatus, wherein the second program is a program that is executed by the image forming apparatus and has an installation function for causing the corresponding application to be executable on the image forming apparatus, and wherein, when the cooperation function is activated, the detecting detects whether the corresponding application exists in the image forming apparatus, and in a case where the corresponding application does not exist in the image forming apparatus, the extracting extracts the second program from inside the first program and the transmitting transmits the extracted second program to the image forming apparatus to install the corresponding application on the image forming apparatus.

3. The control method for the information processing apparatus according to claim 2, wherein, after transmission of the extracted second program to the image forming apparatus, the transmitting transmits information regarding connection between the information processing apparatus and the image forming apparatus to the image forming apparatus.

4. The control method for the information processing apparatus according to claim 1, further comprising detecting a state of the image forming apparatus, wherein the second program is a program that is executed by the image forming apparatus and has an installation function for causing the corresponding application to be executable on the image forming apparatus, and wherein, when the cooperation function is activated, the detecting detects whether the corresponding application is required to be updated on the image forming apparatus, and in a case where the corresponding application is required to be updated, the extracting extracts the second program from inside the first program and the transmitting transmits the extracted second program to the image forming apparatus to update the corresponding application that is required to be updated on the image forming apparatus.

5. The control method for the information processing apparatus according to claim 1, further comprising executing an application program that causes the reading unit of the image forming apparatus to scan a sheet via the information processing apparatus, causes read data to be transmitted to the information processing apparatus, and causes the read data to be transmitted from the information processing apparatus to a server that communicates with the information processing apparatus.

6. The control method for the information processing apparatus according to claim 5, further comprising executing an application program that causes the read data and login information for use in logging into the server to be transmitted to the server.

7. The control method for the information processing apparatus according to claim 1, further comprising executing an application program that enables the reading unit of the image forming apparatus to scan a sheet in response to receipt of an execution notification on the image forming apparatus, based on the extracted second program being transmitted to the image forming apparatus, and causes read data to be transmitted to a server that communicates with the image forming apparatus.

8. The control method for the information processing apparatus according to claim 7, further comprising executing an application program that causes login information for use in logging into the server and the read data to be transmitted to the server.

9. The control method for the information processing apparatus according to claim 1, further comprising executing an application program that causes the reading unit of the image forming apparatus to scan a sheet via the information processing apparatus, causes read data to be transmitted to the information processing apparatus, and causes the read data to be transmitted from the information processing apparatus to a server that communicates with the information processing apparatus.

10. The control method for the information processing apparatus according to claim 1, further comprising executing an application program that is configured to print data onto a sheet using the printing unit of the image forming apparatus.

11. An information processing system comprising:

an image forming apparatus including a reading unit configured to scan a sheet for reading and a printing unit configured to print data on a sheet; and an information processing apparatus configured to execute a first application having a cooperation function of cooperating with the image forming apparatus and to communicate with the image forming apparatus, wherein the first application stores, inside the information processing apparatus, a second application for the image forming apparatus, the second application being an executable installer package having an installation function to cause a corresponding application to be executable on the image forming apparatus, wherein, when the cooperation function is activated by a user operation or an application start-up, the information processing apparatus (a) determines whether a version of the corresponding application installed on the image forming apparatus satisfies a predetermined condition, and (b) extracts, in a case where it is determined that the version does not satisfy the predetermined condition, the second application from inside the first application and transmits the extracted second application from the information processing apparatus to the image forming apparatus to update the corresponding application on the image forming apparatus by executing the executable installer package on the image forming apparatus, and wherein, after completion of the update of the corresponding application, the information processing apparatus instructs the image forming apparatus to execute an image forming processing operation by causing the reading unit to read a document or the printing unit to print data by transmitting an execution instruction addressed to the updated corresponding application to cause the updated corresponding application to control the reading unit or the printing unit.

12. The information processing system according to claim 11, wherein the first application includes the second application.

13. The information processing system according to claim 11, wherein, after the information processing apparatus executes the first application, in response to receipt on the information processing apparatus of an execution notification for causing the reading unit of the image forming apparatus to scan a sheet, the corresponding application in the image forming apparatus is notified of the execution notification, wherein the corresponding application in the image forming apparatus receives the execution notification, scans a sheet with the reading unit and transmits read data to the information processing apparatus, and wherein the information processing apparatus that has received the execution notification transmits the read data to a server that communicates with the information processing apparatus.

14. The information processing system according to claim 13, wherein the information processing apparatus transmits login information, about the first application for use in logging into the server, and the read data to the server.

15. The information processing system according to claim 11, wherein, after the information processing apparatus executes the first application, in response to receipt on the image forming apparatus of an execution notification for causing the reading unit to scan a sheet, the corresponding application in the image forming apparatus is notified of the execution notification, and wherein the image forming apparatus that has received the execution notification scans a sheet using the reading unit and transmits read data to a server that is able to communicate with the image forming apparatus.

16. The information processing system according to claim 15, wherein the information processing apparatus transmits login information for use in logging into the server to the server when the first application is started for a first time.

17. The information processing system according to claim 11, wherein, in response to execution of the first application, the information processing apparatus checks that the corresponding application is installed in the image forming apparatus, and checks a version of the corresponding application, and in a case where updating of the corresponding application is required, the image forming apparatus is caused to execute updating of the corresponding application.

18. The information processing system according to claim 11, wherein, in a case where updating of the corresponding application to be executed by the image forming apparatus is required in a state in which the cooperation function is activated, the image forming apparatus performs updating by executing the second application and reinstalling the corresponding application from the first application to be executed by the information processing apparatus.

19. The information processing system according to claim 18, wherein, in a case where updating of the corresponding application is required, a display unit of the information processing apparatus displays a screen indicating that updating of the corresponding application of the image forming apparatus is required.

20. The information processing system according to claim 18, wherein, before updating the corresponding application, information regarding free space of a storage unit of the image forming apparatus is detected, and based on detection that the free space of the storage unit of the image forming apparatus does not exceed a predetermined capacity, a display unit of the information processing apparatus displays a screen indicating that the storage unit of the image forming apparatus does not have enough free space.

21. The information processing system according to claim 11, wherein the image forming apparatus installs the corresponding application onto a volatile memory.

* * * * *